US011578833B2

(12) United States Patent
Woolman et al.

(10) Patent No.: US 11,578,833 B2
(45) Date of Patent: Feb. 14, 2023

(54) MOUNTING DEVICE

(71) Applicant: TPL IP Holdings Limited, London (GB)

(72) Inventors: Daniel Woolman, London (GB); Stuart Woolman, Charlotte, NC (US)

(73) Assignee: TPL IP Holdings Limited, London (GB)

( * ) Notice: Subject to any disclaimer, the term of this patent is extended or adjusted under 35 U.S.C. 154(b) by 0 days.

(21) Appl. No.: 16/962,453

(22) PCT Filed: Jan. 14, 2019

(86) PCT No.: PCT/GB2019/050085
§ 371 (c)(1),
(2) Date: Jul. 15, 2020

(87) PCT Pub. No.: WO2019/141969
PCT Pub. Date: Jul. 25, 2019

(65) Prior Publication Data
US 2021/0062966 A1   Mar. 4, 2021

(30) Foreign Application Priority Data

Jan. 16, 2018 (GB) .................................. 1800686
May 15, 2018 (GB) .................................. 1807878
Aug. 9, 2018 (GB) .................................. 1812967

(51) Int. Cl.
*F16M 13/02* (2006.01)
*A47G 1/17* (2006.01)
(Continued)

(52) U.S. Cl.
CPC .............. *F16M 13/02* (2013.01); *A47G 1/17* (2013.01); *A47G 1/205* (2013.01); *A47G 29/08* (2013.01);
(Continued)

(58) Field of Classification Search
CPC .......... F16M 13/02; A47G 1/17; A47G 1/205; A47G 29/08; A47G 1/22; A47G 1/175;
(Continued)

(56) References Cited

U.S. PATENT DOCUMENTS

D197,188 S  *  12/1963  Anderson ..................... D8/391
10,624,474 B2 *  4/2020  Taratuta ................ F16B 11/006
(Continued)

FOREIGN PATENT DOCUMENTS

EP    0766941 A1    4/1997
JP    S51120895     10/1976
(Continued)

OTHER PUBLICATIONS

Form PCT/ISA/210, PCT Notification of Transmittal of the International Search Report, PCT/GB2019/050085, dated Jun. 25, 2019.
(Continued)

*Primary Examiner* — Muhammad Ijaz
(74) *Attorney, Agent, or Firm* — Clark Hill PLC

(57) ABSTRACT

A mounting device (1) comprising: a bracket (2), the bracket (2) having a top surface, side surfaces, a rear surface and a front surface; an adhesive pad (4), the adhesive pad (4) comprising a rear surface and a front surface, wherein the rear surface is attached to the rear surface of the bracket (2) and the front surface comprises an adhesive layer; a cover (3), a frame or a bar, wherein the cover (3), the frame or the bar is removably attached to the bracket (2) and either comprises at least one means (8) for attaching an object or has an object integrally attached.

64 Claims, 33 Drawing Sheets

(51) Int. Cl.
  *A47G 1/20* (2006.01)
  *A47G 29/08* (2006.01)
  *A47H 1/104* (2006.01)
  *A47K 10/12* (2006.01)
  *A47K 10/22* (2006.01)
  *B25H 3/04* (2006.01)
  *B62H 3/00* (2006.01)

(52) U.S. Cl.
  CPC ............. *A47H 1/104* (2013.01); *A47K 10/12* (2013.01); *A47K 10/22* (2013.01); *B25H 3/04* (2013.01); *B62H 3/00* (2013.01); *A47K 2201/02* (2013.01)

(58) Field of Classification Search
  CPC .... A47G 1/1606; A47G 1/1633; A47H 1/104; A47H 1/14; A47K 10/12; A47K 10/22; A47K 2201/02; B25H 3/04; B62H 3/00; A47B 96/06
  USPC .............................. 248/549, 466, 467, 475.1
  See application file for complete search history.

(56) References Cited

U.S. PATENT DOCUMENTS

| | | | | |
|---|---|---|---|---|
| 10,724,678 | B1* | 7/2020 | Elliott | F16M 13/02 |
| 11,181,225 | B2* | 11/2021 | Kawaguchi | H04N 5/64 |
| 2021/0062966 | A1* | 3/2021 | Woolman | A47G 1/22 |

FOREIGN PATENT DOCUMENTS

| | | |
|---|---|---|
| WO | 2015148598 A1 | 10/2015 |
| WO | 2016160323 A1 | 10/2016 |

OTHER PUBLICATIONS

Wang Kai, Zhang Jianjian, etc.: "Mechanical Engineering Standard Manual—Piping Accessories Volume", Sep. 30, 2002, China Standard Press.

Zhang Guofeng et al: "Milling Technology", Feb. 28, 2010, National University of Defense Technology Press.

Notification of Office Action received from the China National Intellectual Property Administration for CN. App. No. 201980008587.1 dated Jul. 5, 2022.

Notification of Office Action received from the Chinese National Intellectual Property Administration for CN App. No. 201980008587.1 dated Oct. 10, 2022.

Chapter 1 section 1.1.3 in the book, Construction Mechanics, Qingxia Zhang, et al., Huazhong University of Science Technology Press, May 2010.

Notification of Office Action received from the Canadian Intellectual Property Office for CA App. No. 3120962 dated Sep. 21, 2022.

Notification of Office Action received from the Japanese Patent Office for JP App. No. 2020-538890 dated Nov. 1, 2022.

* cited by examiner

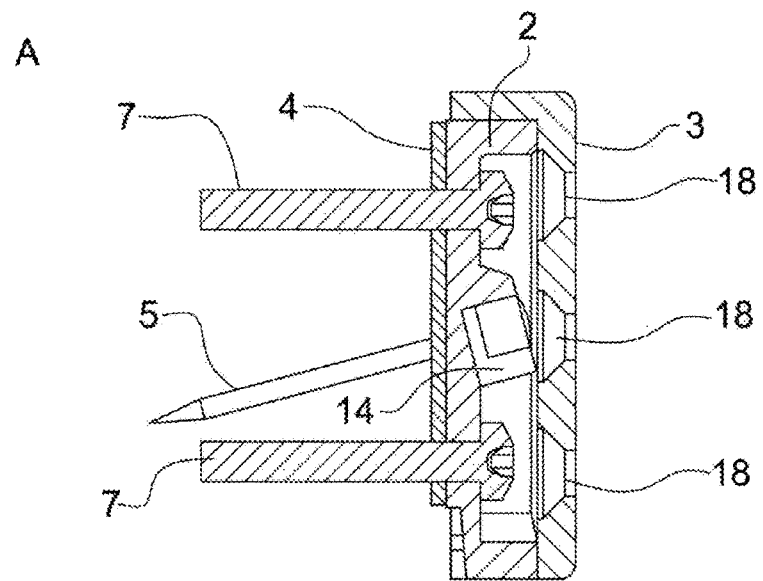
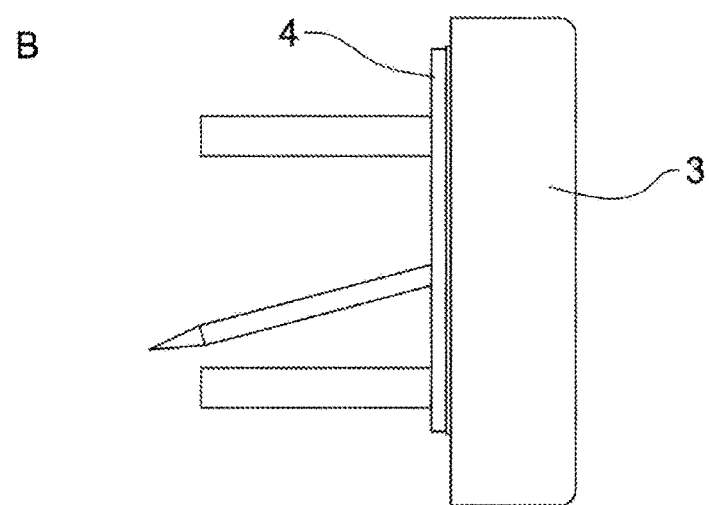
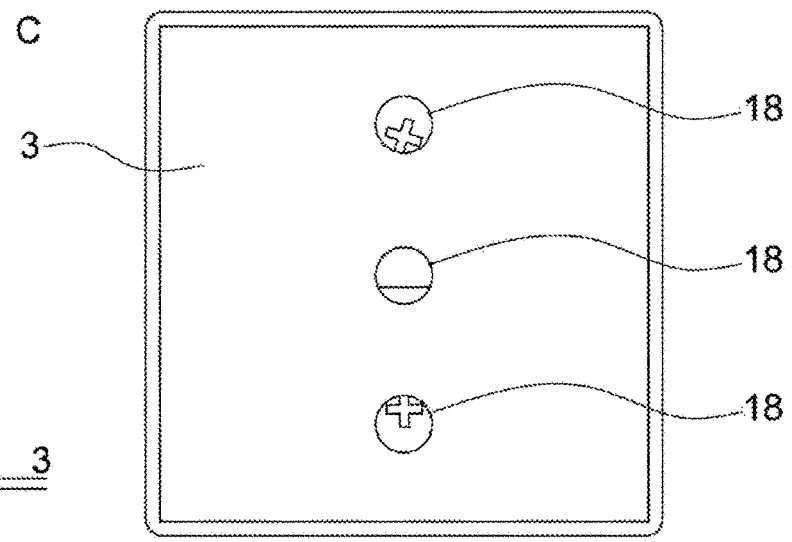
FIG 3

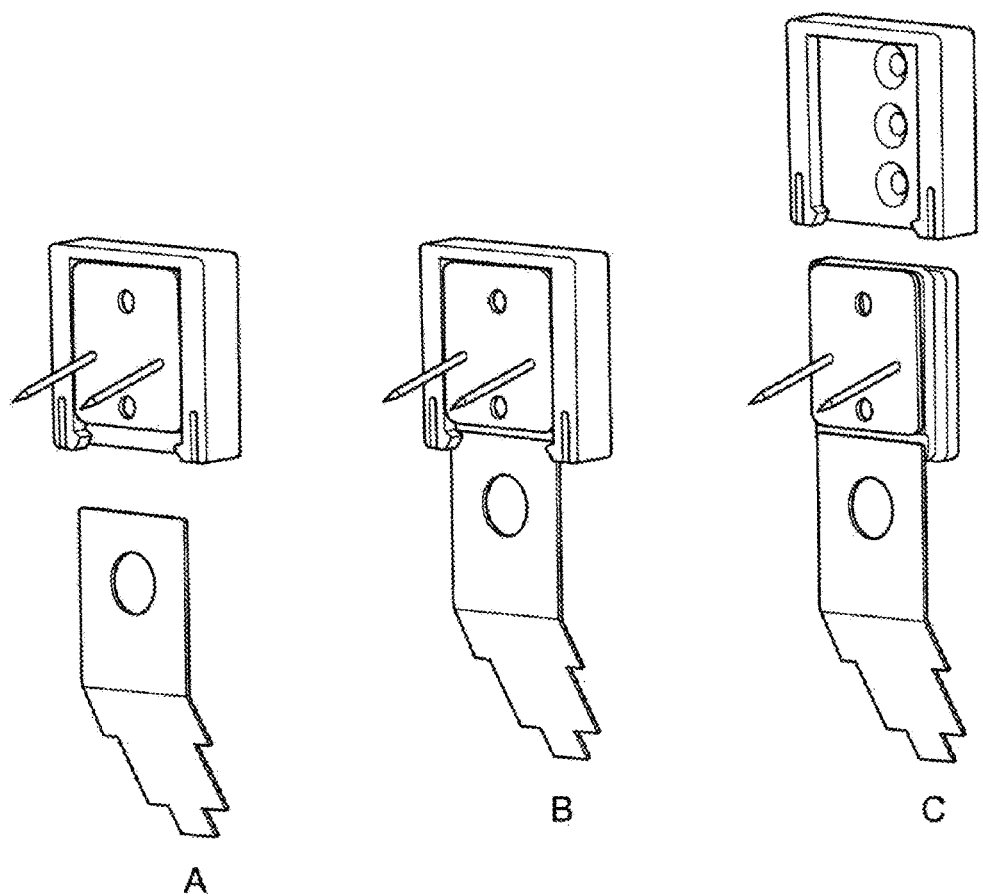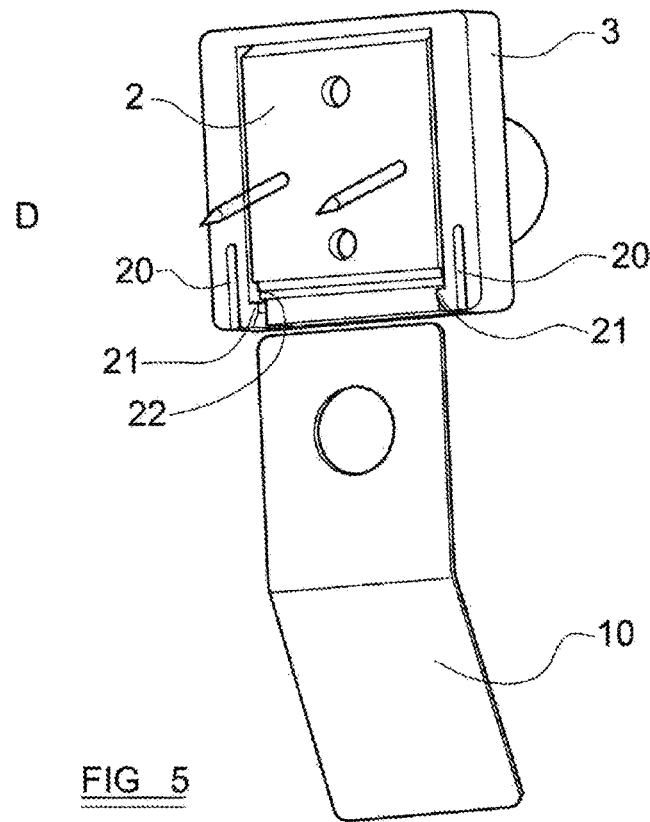
FIG 5

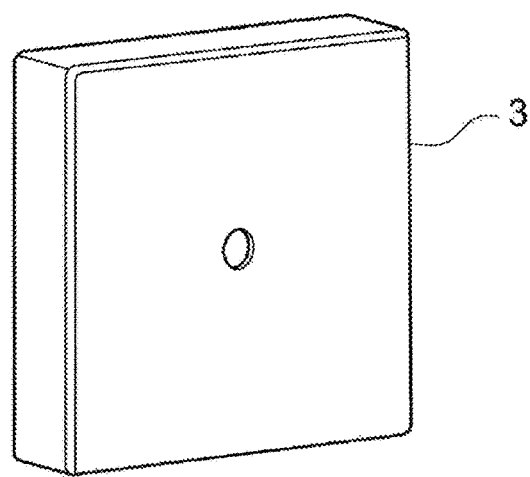
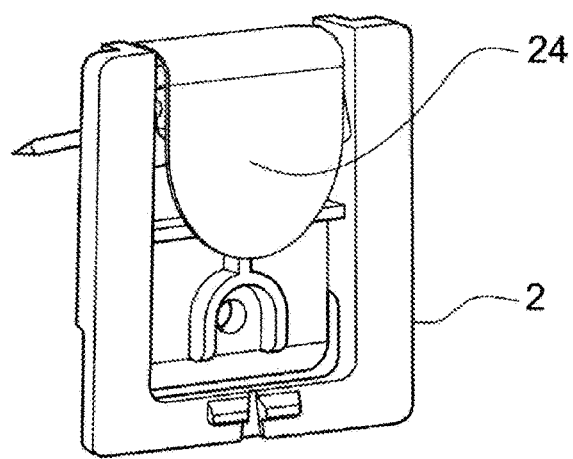
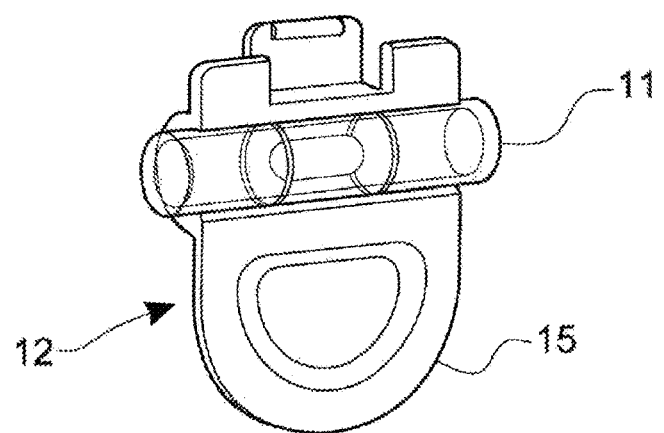
FIG 12

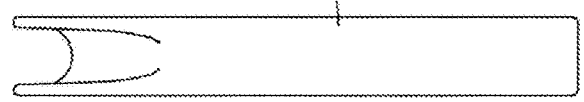
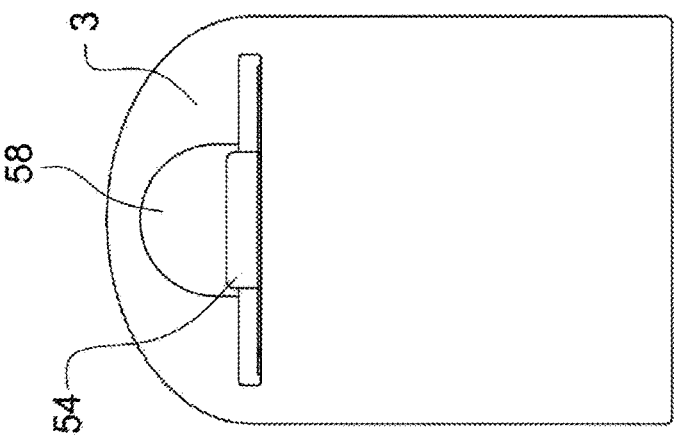
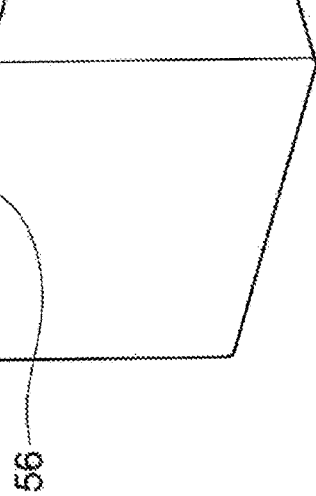
FIG 20D
FIG 20C
FIG 20B
FIG 20A

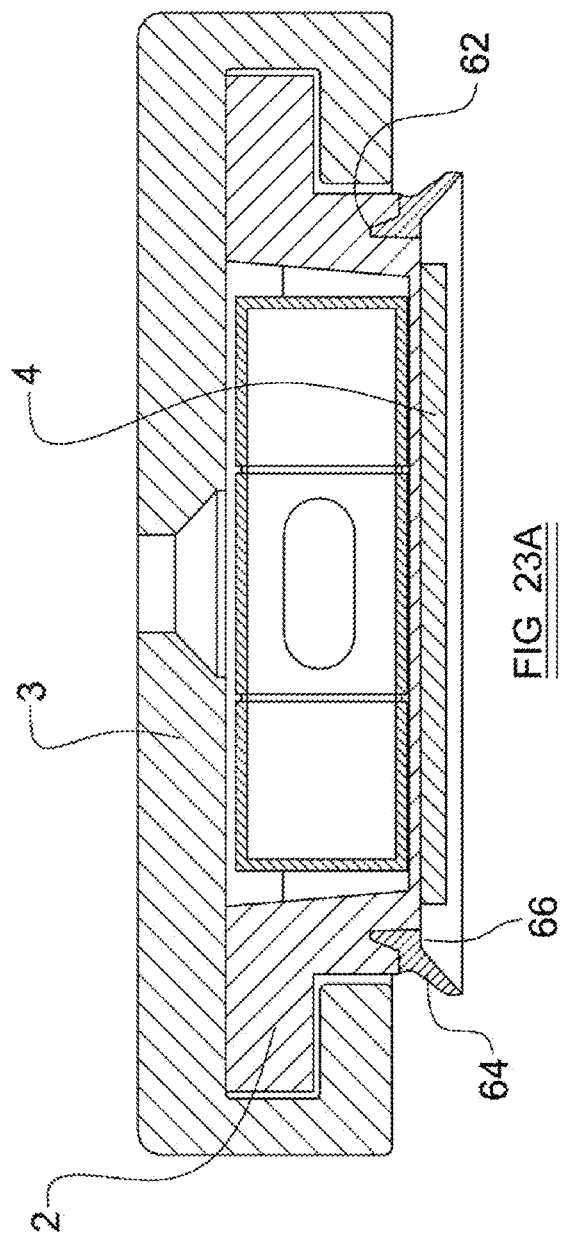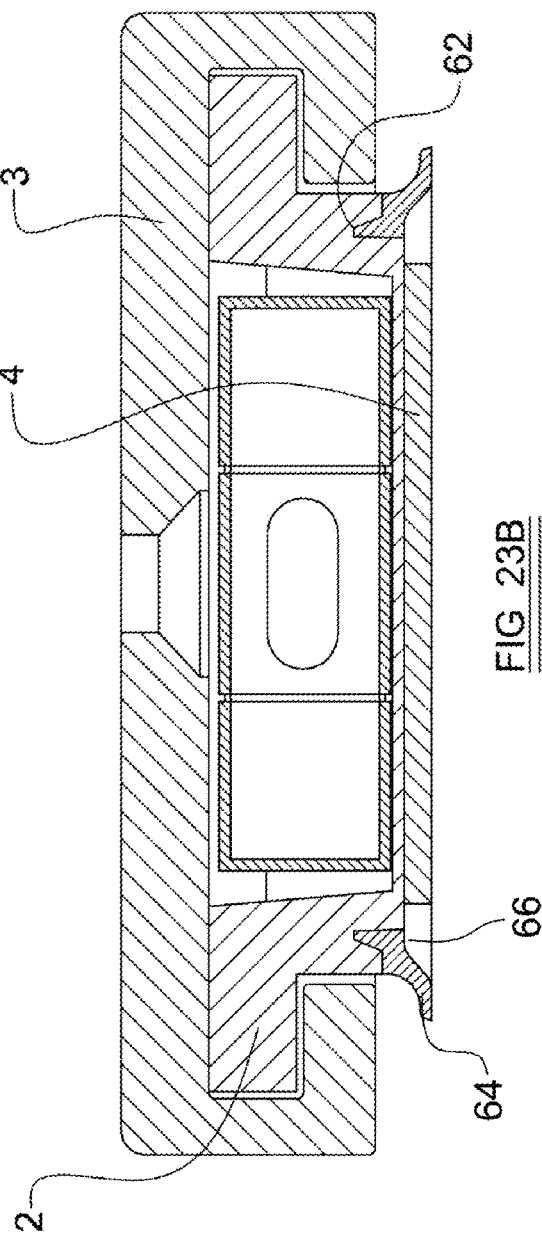

MOUNTING DEVICE

This application is a National Phase Filing of PCT/GB2019/050085, having an International filing date of Jan. 14, 2019, which claims priority of United Kingdom Patent Application No. 1812967.6, filed Aug. 9, 2018; United Kingdom Patent Application No. 1807878.2, filed May 15, 2018; and United Kingdom Patent Application No. 1800686.6, filed Jan. 16, 2018. The disclosure of the foregoing is hereby incorporated by reference.

The present invention relates to attachment means, in particular a means for attaching items to a vertical surface. Especially, the invention relates to an improved mounting device.

Means are available in the art to attach items to vertical surfaces (or near-vertical surfaces) such as walls, doors, fences, windows and the like. One example is a picture hook which, as known in the art, includes a metal hook element with at least one picture pin that passes through a hole or holes in the hook element in order to attach the hook to a wall. In the present specification reference to "picture pin" means any relatively narrow-diameter nail or pin such as those known in the art in connection with picture hook assemblies. In use, the prior art picture hook is hammered into a wall and a picture may be hung from the picture hook using a corresponding hook, string or wire on the picture frame. The picture hook may include the hook element itself together with one pin, or may include multiple pins for better stability.

Prior art picture hooks are suitable for mounting pictures on a wall because pictures (also paintings and photographs) are usually mounted in position on a wall and are not often moved. Furthermore, the picture hook assembly is easy to remove from a wall because the pin may simply be pulled out from the vertical surface. In particular, where the vertical surface is a wall having a coating of plaster, the picture pin may only penetrate the plaster and is therefore readily removed.

However, picture hooks with pins as known in the art are not suitable for mounting of objects which may be moved from time to time. For example, a picture hook could not be used to hang up a coat because day-to-day movement of the coat (when the coat is removed and replaced on a hook), causing movement of the picture hook assembly, would quite quickly work the picture pin loose from the mounting surface so that the picture hook would become unstable or even fall out from the surface. Therefore, other devices are known in the art for mounting items which may be moved.

For example, it is known in the art to provide a hook manufactured from plastic, having a self-adhesive pad (and a release liner to cover the adhesive surface until the hook assembly is needed). In use, the release liner is removed from the adhesive pad and the hook is pressed against the mounting surface. The adhesive bonding between the hook and the surface is sufficient to hold up fairly light objects and to ensure the hook is not easily made loose with respect to the wall, though the entire hook may fall off the wall if the adhesive pad is improperly mounted (for example on a dirty or painted surface) or if it is overloaded by weight. However, if a stronger adhesive is used, with the aim of holding more weight, damage to the mounting surface will be caused when the hook is removed.

Furthermore, it is known to attach hooks to surfaces using regular screws (optionally with a fixing anchor such as a Rawlplug). However, the disadvantage of this is that, even though the connection is strong, the connection causes permanent damage to the wall. Therefore, when the attachment is removed the mounting surface may require substantial repair e.g. filling in of plasterwork. Additionally, mounting a hook to a wooden door with such a system would cause irreversible damage to the fabric of the wooden door. Unlike the present invention, use of screws also requires tools.

The present invention encompasses an improvement over such prior art systems using a novel and inventive adhesive pad with pin arrangement. The inventors of the present invention have surprisingly found that an adhesive pad with pin arrangement is advantageous whereby the pin or pins carries the weight of an object to be mounted and the adhesive pad prevents movement of the pin or pins with respect to the mounting surface (i.e. the problem outlined above). Mitigation of the pin-movement problem means that the pin system can be used to reliably mount objects which may be moved. The inventors believe that the system presented below is capable of carrying up to 20 kg in weight per hook (based on a two-pin system with an adhesive pad as described below).

Furthermore, the inventive device is modular, unlike systems known in the art. In other words, rather than being limited to a simple hook, the arrangement of the present invention provides a detachable cover system on which many different forms of attachment may be mounted.

According to the present invention there is provided a mounting device comprising:
  a bracket, the bracket having a top surface, side surfaces, a rear surface and a front surface;
  an adhesive pad, the adhesive pad comprising a rear surface and a front surface, wherein the rear surface is attachable to the rear surface of the bracket and the front surface comprises an adhesive layer;
  a cover, frame or bar, wherein the cover, frame or bar is removably attachable to the bracket and either comprises at least one means for attaching an object or has an object integrally attached.

Preferably, the rear surface of the bracket comprises a circumferential trench.

Advantageously, the rear surface of the bracket comprises a perimeter having a length, wherein the trench extends along the entire length of the perimeter.

Conveniently, the device further comprises a sealing element connected in or on the trench, wherein the sealing element engages the entire trench and preferably wherein said connection is made by over-moulding.

Preferably, the bracket further comprises at least one pin aperture to receive at least one pin from the front surface through to the rear surface, wherein the device further comprises at least one pin.

Advantageously, the at least one pin aperture of the bracket is configured to receive the at least one pin in a direction pointing downwardly away from the top surface of the bracket and at an angle relative to the top surface of the bracket in the range of approximately 0 to 45°, and more preferably in the range of approximately 10-30°, and most preferably approximately 15 degrees.

Conveniently, the device comprises two or more pins and the bracket comprises respective two or more pin apertures for receiving said two or more pins.

Preferably, the two or more pins are connectable by a bridge.

Advantageously, the two or more pin apertures are aligned parallel to the top surface of the bracket.

Conveniently, the device comprises two picture pins and the bracket comprises two pin apertures for receiving said two picture pins.

Advantageously, the device comprises three picture pins and the bracket comprises three pin apertures for receiving said three picture pins.

Preferably, the device comprises four picture pins and the bracket comprises four pin apertures for receiving said four picture pins.

Advantageously, the bracket further comprises at least one screw aperture for receiving at least one screw on the front surface thereof.

Conveniently, when the device comprises a cover, the cover is slidably attachable to the bracket.

Preferably, when the device comprises a cover, the cover comprises at least one side wall.

Advantageously, the bracket further comprises a rail on at least one of said side surfaces and preferably on two of said side surfaces.

Conveniently, the or each at least one side wall of the cover comprises an inner surface, wherein at least one said inner surface comprises a groove for receiving the rail of the bracket.

Preferably, the cover comprises a top face, a right side wall and a left side wall, wherein at least the right side wall and the left side wall each comprise a groove for receiving the rail of the bracket.

Advantageously, the rail comprises a left edge and a right edge, wherein the left side wall of the cover comprises a groove for receiving the left edge and the right side wall of the cover comprises a groove for receiving the right edge.

Preferably, when the device comprises a cover, the cover is attachable to more than one bracket.

Conveniently, when the device comprises a cover, the at least one means for attaching an object comprises one or more of a notch, an aperture, a hook or a magnetic pad.

Preferably, when the device comprises a cover, the cover comprises at least one screw hole for attaching an object, optionally wherein the screw hole is blanked.

Advantageously, when the device comprises a cover, the cover comprises a front surface, the at least one means for attaching an object is a hook and the hook is slidable between a first position in which the hook does not protrude from the front surface of the cover and a second position in which the hook protrudes from the front surface of the cover.

Conveniently, the hook comprises an object aperture for receiving part of the object.

Preferably, the front surface of the cover comprises a finger depression adjacent to the hook.

Advantageously, when the device comprises a cover, the cover comprises at least one means for attaching an object and the device further comprises an object which is removably attachable to the cover.

Conveniently, the object is selected from one of a hook, an LED light, a clock, a rail, a shelf, a picture frame, a toilet roll holder, or a gallery kit housing for projecting one or more laser beams.

Preferably, the object is a gallery kit housing, and the gallery kit housing comprises a rotatable portion.

Conveniently, the device comprises a picture frame or shelf integrally attached to the cover, wherein the picture frame or shelf is integrally attached to more than one cover.

Advantageously, the adhesive pad comprises a release tag for removal of the adhesive pad.

Conveniently, in use, the release tag is sandwiched between the top surface of the bracket and a top face of the cover and is thereby not visible.

Preferably, when the device comprises a frame, the frame comprises:
an opening configured to receive the bracket;
a front surface surrounding the opening;
a top surface comprising a first rear rail; and
a bottom surface comprising a second rear rail, wherein a first groove is located between the first rear rail and the front surface, and a second groove is located between the second rear rail and the front surface.

Advantageously, when the device comprises a bar, the bar comprises at least one opening configured to receive the bracket.

Conveniently, the device further comprises a plurality of brackets and the bar comprises at least a corresponding number of openings for receiving the plurality of brackets.

Preferably, the openings are evenly spaced along the length of the bar.

Advantageously, the bar comprises a rear surface and a front surface, wherein the rear surface of the bar comprises one or more lengthwise fins, and more preferably wherein the one or more fins extend along substantially the entire length of the bar.

Conveniently, the bar comprises a top surface and a bottom surface, each of the top and bottom surfaces having bar rails, the bar rails of the top surface defining a first lengthwise groove and the bar rails of the bottom surface defining a second lengthwise groove.

Preferably, the lengthwise grooves of the bar rails extend along substantially the entire length of the bar.

Advantageously, the device further comprises at least one cover, wherein each cover comprises at least one means for attaching an object or has an object integrally attached and wherein each cover is attachable to the frame or the bar.

Conveniently, each frame or bar cover comprises a top surface and a bottom surface, wherein the top surface comprises a first flange for attachment to the first groove of the frame or bar and the bottom surface comprises a second flange for attachment to the second groove of the frame or bar.

Preferably, the bar further comprises at least one slot for locating a cover.

Advantageously, the cover is removably attachable to the bracket, frame or bar via a snap fit, interference fit or friction fit between the cover and the bracket, frame or bar.

Conveniently, the device further comprises a release key configured to release a snap fit between the cover and the bracket, frame or bar.

Preferably, in use, a towel rail, a curtain or curtain rail, a tool rack or a bike rack are mountable to the bar.

Advantageously, the device further comprises a lever, the lever comprising a lever arm pivotably attached to a base.

Conveniently, the base of the lever comprises a bottom edge, wherein the bottom edge is configured to be received by one of the grooves of the frame or one of the grooves of the bar, and preferably wherein the base comprises a lip for retaining the lever in the groove of the frame or groove of the bar.

Preferably, the lever arm comprises one or more projections positioned to align with the, or each, pin aperture of the bracket when the lever is attached to the frame or bar, and the frame or bar is attached to the bracket.

Advantageously, the lever is movable between an open position and a closed position, wherein when the lever is attached to the rail of the frame or bar rail of the bar the one or more projections may act on the one or more pins.

Conveniently, the device further comprises a spirit level unit.

Preferably, the spirit level unit is detachable and comprises a spirit level vial and optionally a spirit level holder.

Advantageously, the bracket comprises a means of attachment for the spirit level unit.

Conveniently, the spirit level unit comprises a finger pull tab or handle.

Preferably, the spirit level unit is integral with the front surface of the bracket.

According to the present invention there is also provided a kit comprising a mounting device and one or more of:
- an object for attachment;
- one or more attachment screws for attaching an object for attachment;
- a release key for releasing a cover from a bracket, frame or bar;
- at least one screw for screwing the bracket to a mounting surface;
- a detachable spirit-level unit;
- at least one pin or a plurality of pins;
- one or more covers;
- one or more brackets;
- a frame;
- a bar;
- a lever; and
- a template installer.

FIG. 3 shows several views of a device according to the invention when mounted on a surface;

FIG. 5 is a perspective and exploded view showing removal of the cover from the bracket of the invention;

FIG. 12 is a perspective view showing the device of FIGS. 9 and 10;

FIGS. 20A to 20D show perspective views of an alternative cover with integral hook for use with the present invention in front and side configurations;

FIGS. 23A and 23B show cross-sectional views of a device according to the present invention;

Figure 1:
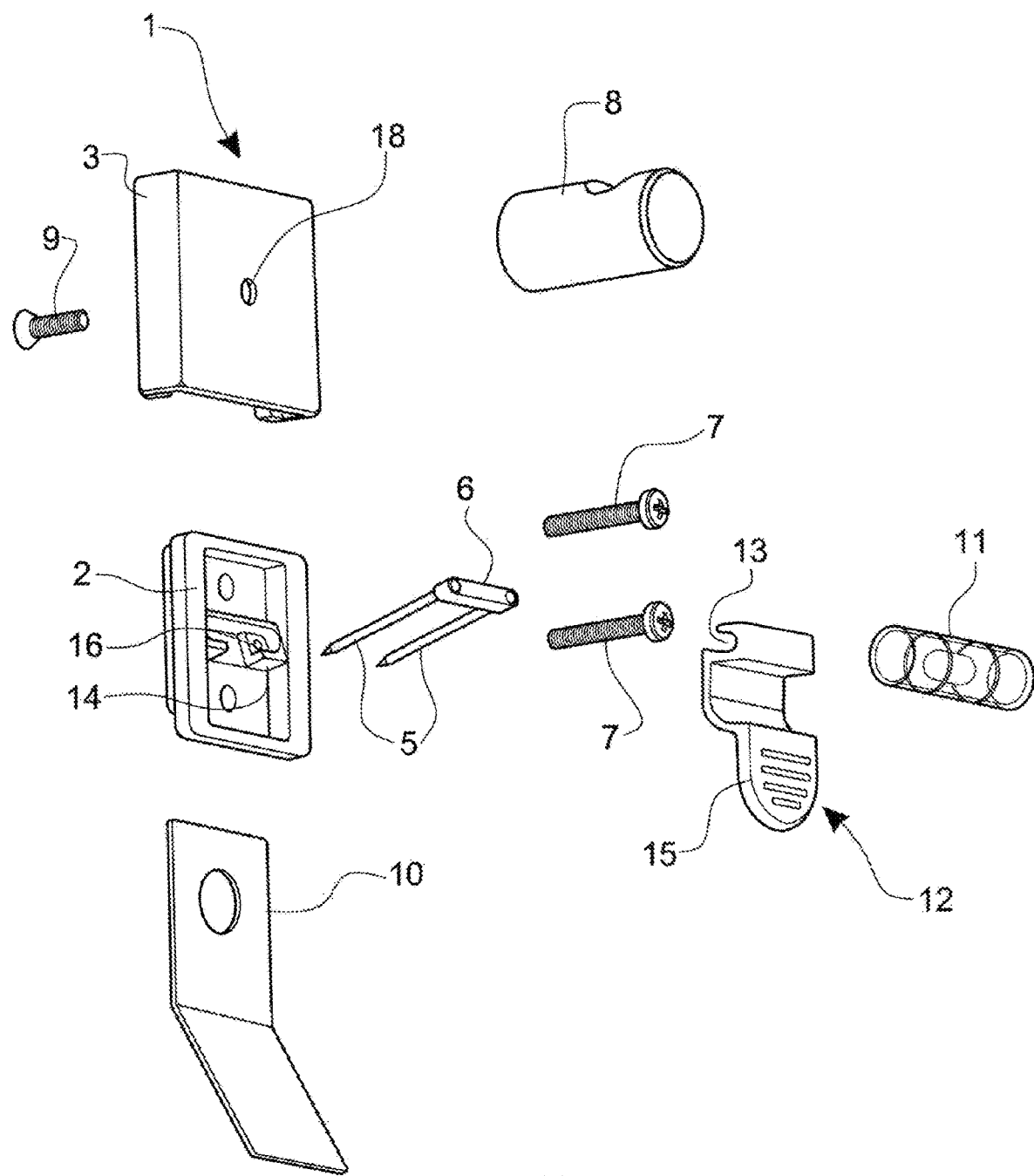
FIG. 1 is a perspective exploded view of a device according to the invention, from the front side.

FIG. 1 depicts generally a device 1 according to the present invention. The device 1 includes a bracket 2 which is to be mounted upon a generally vertical surface such as a wall (made of any material including brick and concrete, optionally covered by plaster), fence or door. As shown, the bracket 2 is provided with two horizontally-spaced holes. These are dimensioned and configured to allow pins 5 to pass there through from the front face of the bracket to the rear face, and into the mounting surface. While the majority of the figures of this application depict two pins, it is to be appreciated that the device of the invention could include one pin or more than two pins. For example, the device may contain four pins and the bracket 2 may comprise four holes for receiving the four pins, each hole located at the corner of a rectangle. The inventors have found that the use of two pins 5 provides sufficient mounting strength for domestic purposes.

As shown, the two pins 5 are themselves mounted in a bridge 6. The bridge 6 serves to space the pins 5 apart at a fixed horizontal distance to match the spacing of the pin holes 16 in the bracket. It is to be appreciated that the pins 5 together with the bridge 6 need not be three separate items but could be a unitary component i.e. a single "pinhead" having two spaced apart pins. Alternatively, the bridge 6 can be a separate component having two holes therethrough to allow the mounting of two pins 5. In other aspects, the pins 5 and bridge 6 could be in an alternative arrangement such as a unitary piece having two legs (pins) connected with a crossbar.

The inventors have found that the bridge 6 spreads weight across the bracket 2, thereby increasing the amount of weight the device can hold. In other words, in terms of improving the weight-carrying ability of the device 1, providing a bridge 6, which connects pins 5 together in some manner as described above, enhances the weight-carrying ability.

In use, the pins 5 are inserted through the pin holes 16 in the bracket 2 for mounting of the bracket 2 on the surface. In advantageous aspects, the pins 5 are pointed downwardly (in use) through the bracket 2. The inventors have discovered that the most advantageous direction of the pin 5 is to point is approximately 15 degrees downwardly i.e. 15 degrees beneath horizontal, although any angle in the range of 10 to 30 degrees would provide good results. A lesser angle such as zero degrees (horizontal) would also be functional, as would an angle up to 45 degrees. However, at 45 degrees the head of pin 5 takes up more space within the bracket 2, due to the angle of mounting, and also the pin 5 needs to be longer in order to penetrate the mounting surface, as compared to a lesser angle.

The bracket 2 is also provided with screw holes 17 for the optional attachment of screws 7. Screws 7 pass through screw holes 17 from the front to the rear of the bracket and may be screwed into the mounting surface in a manner known in the art. However, the screws 7 are optional for the circumstance that an exceptionally heavy item needs to be mounted and the user is not concerned with screw holes damaging the mounting surface.

The device furthermore comprises a cover 3. As will be described in more detail below, the cover 3 has a front surface, a top surface and two side surfaces. In use, the cover 3 is slid downwardly onto the bracket 2 and is removably clipped into place via a snap, press, friction or other interference fit (in a variety of ways, some of which are described below), thereby covering the internal workings of the bracket 2 including the heads of the pins 5 and screws 7 if used. This hides the heads etc. and provides a more aesthetically pleasing arrangement.

The cover 3 is shown as being provided with a single attachment screw hole 18. In use, an attachment, such as the hook attachment 8 depicted, is attached to the cover using attachment screw 9, as is evident from FIG. 1. As described further below, the arrangement of the invention allows the attachment of a vast range of different attachments. Moreover, while the cover 3 is shown with a screw hole 18, it is not necessary that the screw hole be present. The cover could be provided with "blanks" being screw holes 18 covered with a thin layer of plastic during the moulding process, which may be broken through by a user inserting a screw 9. Alternatively, the cover 3 could instead comprise in or on its front surface a magnet for the attachment of keys, knives and the like.

Additionally, while the cover 3 is depicted here as being flat and having a separate hook 8, the cover 3 could have attached or incorporated a hook as a unitary structure. For example, the cover and hook could be a single unitary moulding. The cover, as depicted, may be square, having dimensions of 20-50 mm square. Preferably, the cover may have a dimension of 35 mm by 35 mm and depth of 8-10 mm.

Figure 2:
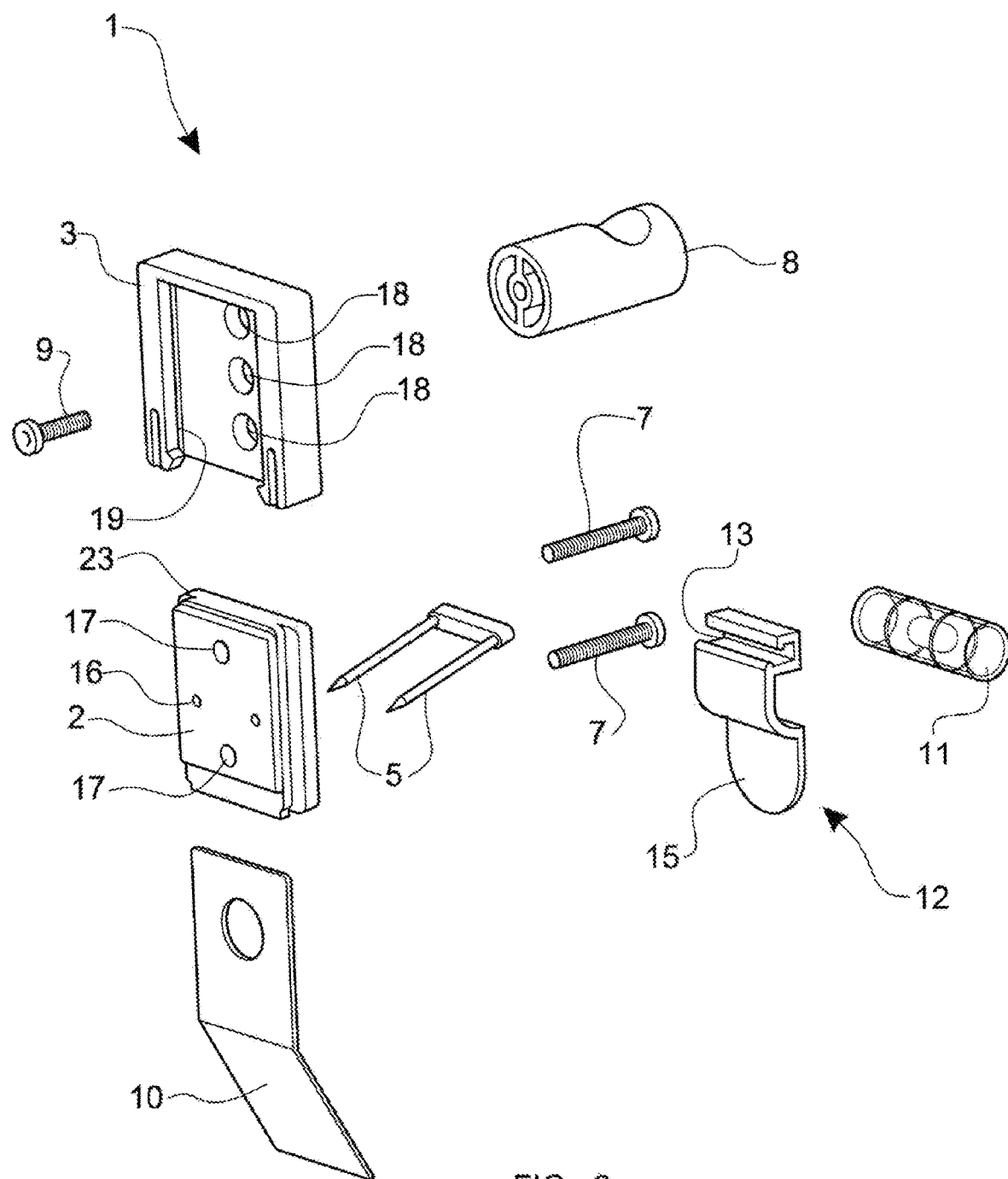
FIG. 2 is a perspective exploded view of a device according to the invention, from the reverse side.

Turning now to FIG. 2, the device of FIG. 1 is shown from a rear perspective. Staying with the screw holes 18, it can be seen that the middle screw hole 18 (in the vertical direction) is open, as depicted in FIG. 1, but the upper and lower screw holes 18 are "blanks", as described above. It can also be seen from FIG. 2 how the hook attachment 8 is screwed to the cover 3 using an attachment screw 9.

FIGS. 1 and 2 additionally show an optional cylindrical vial 11 together with a spirit level clip 12 which includes a spirit level clip handle 15 and a spirit level clip groove 13 for mounting of the spirit level clip 12 to the bracket 2. This will be described further below.

Furthermore, FIGS. 1 and 2 also illustrate an optional release key 10 for releasing the cover 3 from the bracket 2 as will be described later.

Referring to FIG. 3A, there is depicted a cross-section through the device of the invention in the mounted position. As can be seen from FIG. 3A, the device further comprises an adhesive pad 4 which may cover part or substantially all of the rear face of the bracket 2. The adhesive pad 4 contacts the mounting surface. As known in the art, the adhesive pad includes a base material and an adhesive layer such as a pressure sensitive adhesive (PSA). Furthermore, as known in the art the adhesive pad 4 may be covered by a release liner, which is a further sheet of material that is easily peeled away from the adhesive layer in order to reveal the sticky surface of the adhesive layer.

Therefore, the device may be sold to a user including an adhesive pad 4 already in place together with a release liner which needs to be removed before mounting the device 1 on a surface. The adhesive pad 4 may be attached to the rear face of the bracket 2, itself with a further adhesive. Preferably, the adhesive pad is a double-sided adhesive pad having one side of adhesive for sticking to the rear of the bracket 2 and a second side of adhesive for sticking to the mounting surface. The adhesive pad 4 may be an adhesive tape i.e. a relatively thin base material on which two sides of adhesive are provided, or a relatively thicker layer with adhesive on each side.

The device of the invention could be sold to consumers with the adhesive pad 4 already in place, or the adhesive pad 4 could be provided in a kit for the user to attach to the bracket 2. Furthermore, the adhesive pad 4 can be pre-drilled with holes corresponding to pin holes 16 and/or screw holes 17, or the adhesive pad can be provided as a single continuous sheet.

It is to be appreciated that the device 1 of the invention could alternatively be provided without a pin or pins 5; rather the device is attachable to a mounting surface by adhesive pad 4 alone. It is expected that a device of the invention having only an adhesive pad would be able to carry less weight than a corresponding device 1 with an additional pin or pins 5. Nevertheless, the novel bracket and cover arrangement is useful for carrying lighter objects that may be moved.

Staying with FIG. 3A, it is shown how the three screw holes 18 are countersunk from the inside of the device so as to allow the cover to close properly over the base 2 (because the heads of the countersunk screws are seated within the material of the cover 3). It is also shown how the pin 5 is angled downwardly from horizontal as described above. Furthermore, it is shown how the head of pin 5 is supported, to achieve the downward angle of the pin, by an abutment 14.

FIG. 3B is a side-on view of the device of FIG. 3A showing more clearly the cover 3 and adhesive pad 4. FIG. 3C depicts the front surface of the cover 3 with all three screw holes 18 opened up for use.

Figure 4:
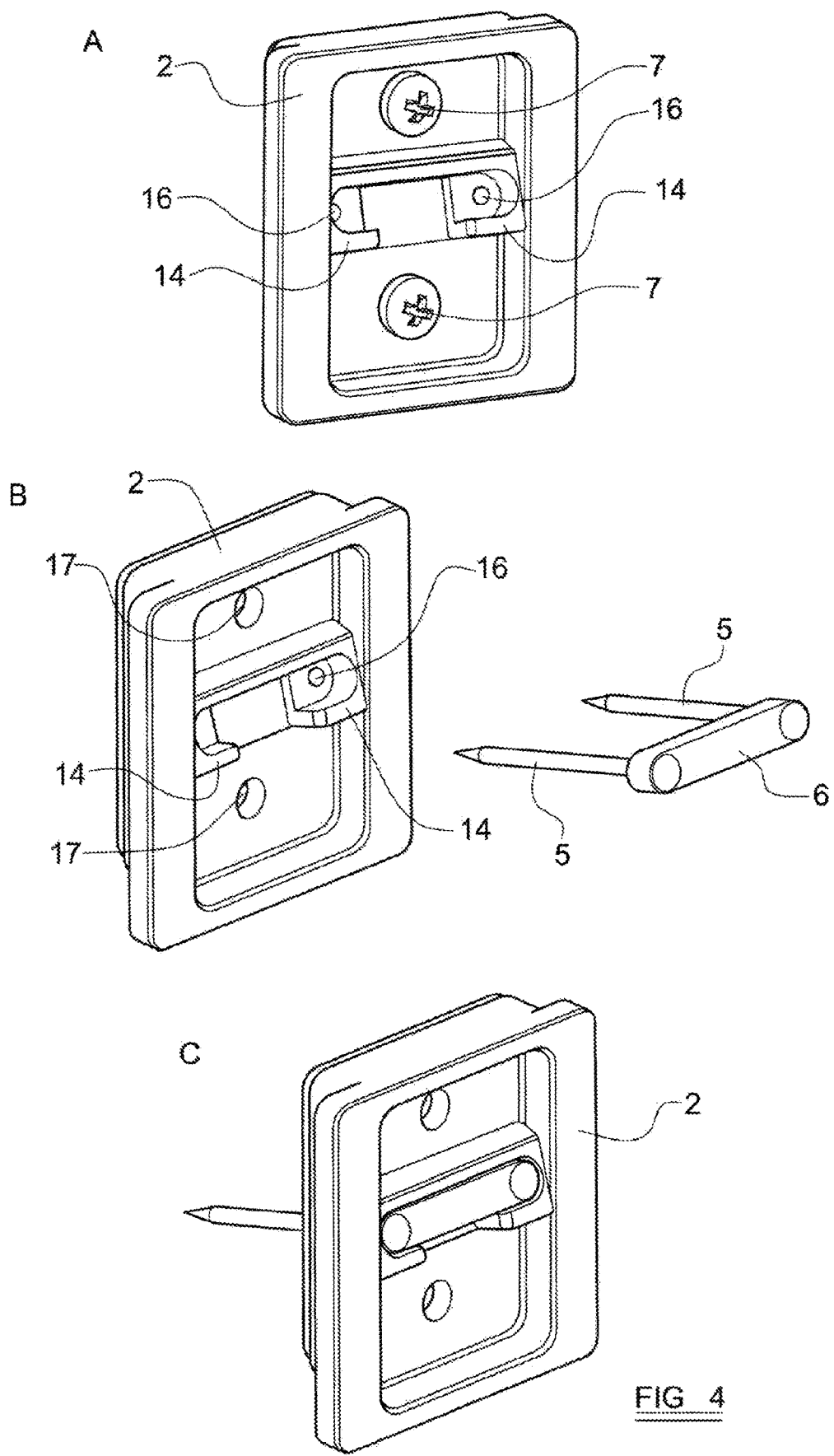
FIG. 4 shows an exploded perspective view of a bracket and associated components of the claimed invention.

FIG. 4 shows some operations of the device. FIG. 4A is a depiction of the device with optional screws 7 being used to screw the device into the mounting surface. FIG. 4B depicts the attachment of pins 5 with bridge 6. The pins 5 are inserted through pin holes 16 and then the arrangement of pins 5 and bridge 6 is pushed, hammered or otherwise urged forwards until the pins 5 and bridge 6 are fully located within bracket 2 and the pins engage the mounting surface. FIG. 4C shows the pin arrangement in place.

As can be seen best from FIG. 4B, there is provided an abutment 14. It is shown how abutment 14 is provided in the region of both pins 5 but not in the region between the two pins 5. As noted above, abutment 14 supports the pins 5. Additionally, the abutment 14 allows the bridge 6 to be located in place because the abutment is correspondingly sized and configured to match the bridge 6. The abutment may be moulded or otherwise formed in a shape corresponding to the bridge. The abutment is arranged to securely hold the bridge 6, allowing for greater weight to be carried by device 1 and providing greater stability to the device as a whole.

The absence of abutment 14 in the region between the two pins 5 allows for the pins to be easily removed. The gap between the bridge 6 and the abutment 14 means that a user can insert a pointed object, such as a screwdriver, pen or the like, and readily pull up on the bridge 6, thereby retracting the pins 5 from the mounting surface.

To better understand how the cover 3 is mounted onto the bracket 2, we return momentarily to FIG. 2 which depicts a reverse view of the bracket. Here it can be seen how the cover 3 possesses an interior groove 19 on the inside surface of its side wall. Due to the angle of FIG. 2, only one such groove 19 can be seen but in reality the groove 19 is repeated on each sidewall of the cover.

The bracket 2 is provided with rails 23 provided on its respective side edges. The rails 23 are regions which extend laterally further than the rear face of the bracket 2, thereby forming protrusions which are dimensioned and configured to fit inside respective side wall grooves 19 of the cover 3. While a system of rails 23 and corresponding grooves 19 are depicted, in practice any system of cooperating parts which allows the cover to slide down onto the bracket can be used. In use, the cover 3 is slid downwardly onto the bracket 2, with the rails 23 cooperating with the grooves 19. The cover 3 slides down until the sliding action is stopped by the top edge of the cover 3 abutting the top edge of the bracket 2.

The cover 3 is clipped into place on the bracket 2 in a manner which is best shown in FIG. 5, and in particular in FIG. 5D. Here, it is shown how the side walls of the cover 3 are provided with cut-outs 20 which will henceforth be referred to as deformation gaps since they allow the lowermost ends of the cover side walls to deform or deflect. It can be seen that the lowermost ends of the cover are also provided with cover abutments 21. Therefore, as will be appreciated, when the cover 3 is slid onto the bracket 2 the cover abutments 21 deflect outwardly in order to allow the cover to slide down. This deflection is made possible by the presence of deformation gaps 20. It is also shown how the bracket 2 possesses notches 22. In use, when the cover is slid downwardly, and once the cover abutments 21 have passed over the notches 22, the deformation gaps reopen allowing the cover abutments 21 to spring into place behind notches 22, thereby locking the cover 3 onto the bracket 2 in a snap-fit arrangement (a torsional snap-fit). This achieves reliable and secure locking of the cover 3 onto the bracket 2. Other types of fit are, however, envisaged such as an interference fit between the mating parts (bracket and cover).

In order to release the cover 3 from the bracket 2, the invention also optionally provides a release key 10. The mode of action of release key 10 is shown in FIGS. 5 to 5C. The release key 10 is pushed upwardly between the cover abutments 21, thereby re-deflecting the abutments 21 and closing the deformation gaps 20. This reverses the torsional snap-fit described above and allows the cover 3 to be slid upwardly along the rails 23 and off the bracket 2.

However, it is to be appreciated that the key 10 is not essential to the invention, and while it may be provided as a preferable feature it is not mandatory. If no key 10 is provided, the user can instead release the snap fit between the cover 3 and bracket 2 by manually urging the abutments 21 outwards, thus closing the deformation gaps 20 and allowing the cover 3 to be slid upwardly without the use of an additional tool.

Figure 6A:
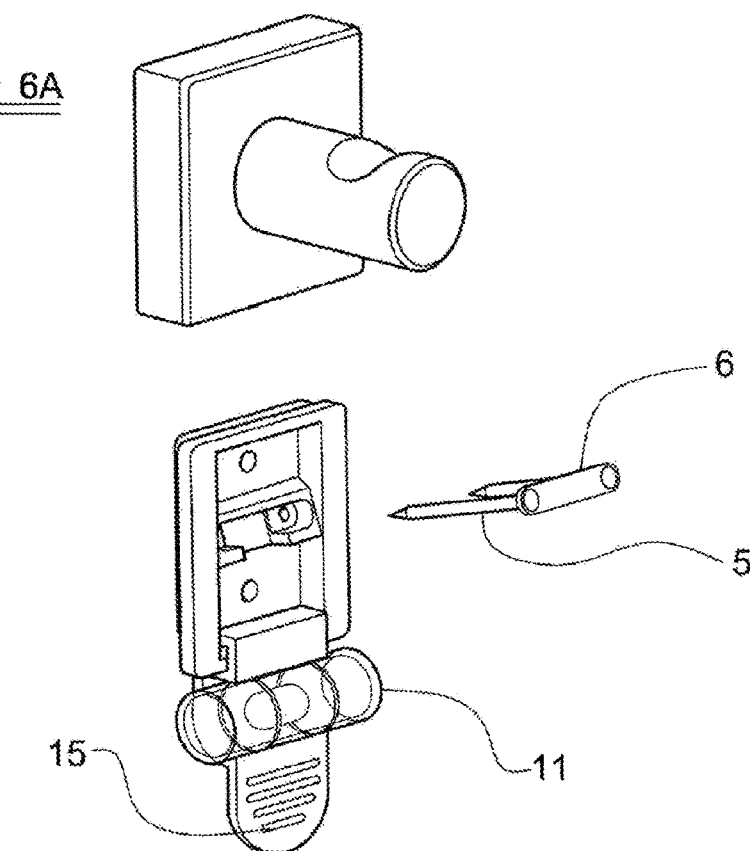
FIGS. 6A and 6B are further perspective and exploded views of a device according to the invention.
Figure 6B:
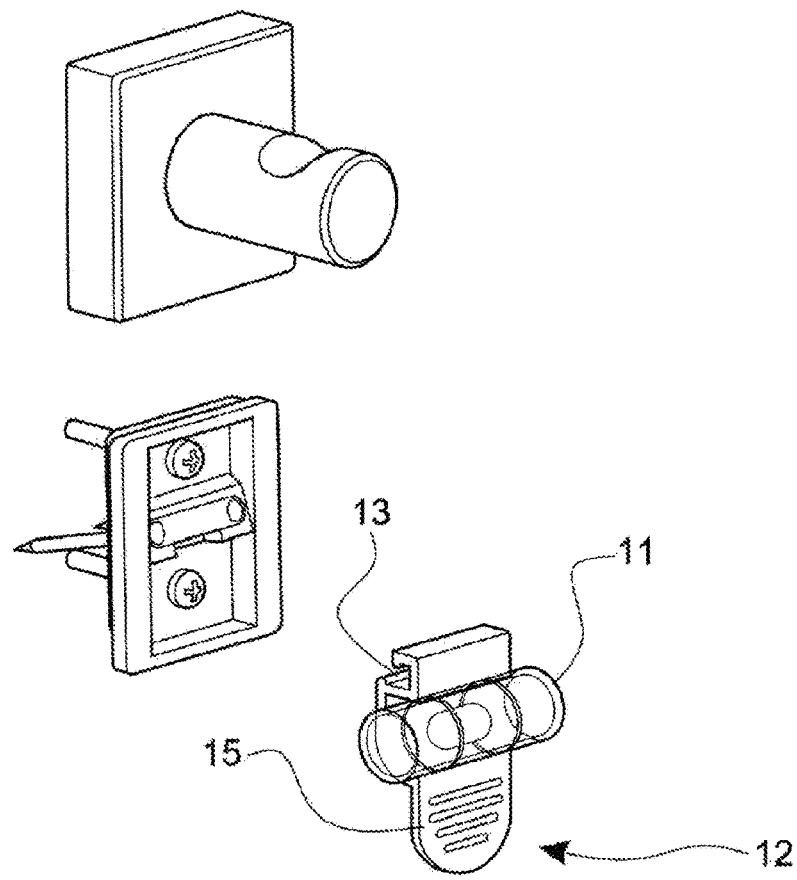

Concerning the spirit level arrangement shown in FIGS. 1 and 2, this is described in more detail in FIGS. 6A and 6B. As can be seen from FIGS. 1, 2 and 6, there is optionally provided as part of the invention a spirit level clip 12 which, as shown in FIG. 6A, may be temporarily mounted on the bracket 2 via the spirit level clip groove 13. Groove 13 may be attached to the lower edge of bracket 2. A cylindrical or other spirit level vial 11, for example, can be inserted into spirit level clip 12, for example by means of a push-fit, whereby the clip 12 has an area of suitable dimension for insertion of the vial 11. Spirit level clip holder 15 allows the user to easily manipulate the assembly and introduce the clip 12 into the bracket 2.

When assembled, as shown in FIG. 6A, the spirit level assembly allows the user to position the bracket 2 in a horizontally level manner on the mounting surface. The pins 5 and bridge 6 can then be introduced as described above. Once the pins 5 are introduced, the spirit level assembly can be removed from the bracket 2.

The protruding clip handle 15 shown in FIG. 6A prevents the user from closing the cover 3 without having first removed the spirit level. The spirit level arrangement blocks the lower part of the device meaning the cover 3 will not fully slide down if the vial 11 is still in position.

It is to be appreciated that the spirit level components, including the spirit level vial 11 and the spirit level clip 12, may be provided separately to the user, for example in a kit including a device of the invention together with the spirit level components.

Figure 19:
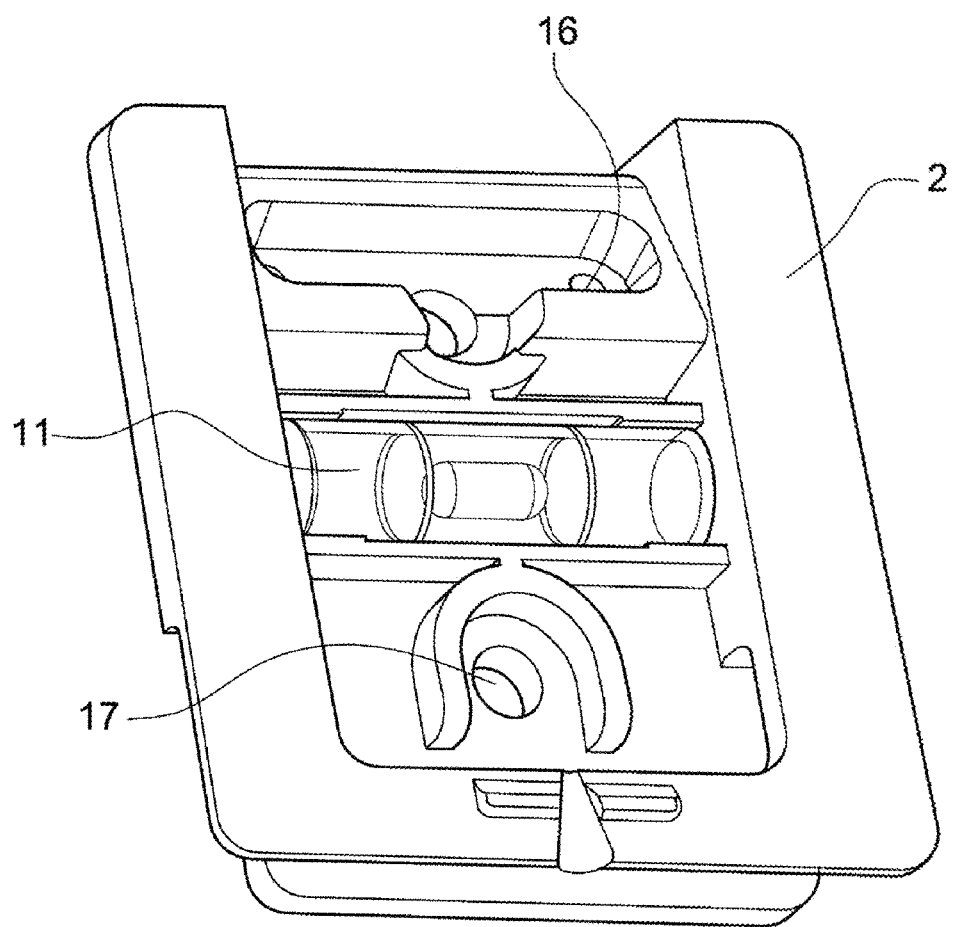
FIG. 19 shows a perspective view of a bracket and integral spirit level according to the present invention.

It is also to be appreciated that the spirit level vial 11 may be integral to the bracket 2. FIG. 19 depicts an advantageous arrangement of the invention wherein the spirit level vial 11 is built into the front surface of the bracket 2 and is not removable. This has the advantages of providing the customer with fewer separate parts, and also means that the spirit level vial 11 is always present in the device for example if the customer wishes to move or remount the device.

The spirit level vial may have a diameter of 4-8 mm or 6 mm with a length of 10-19 or 14 mm depending on the size of the overall device and the available space. In general, it is preferred to use the largest spirit level vial possible in the space because the larger the vial 11, the more accurate the measurement.

Figure 7:
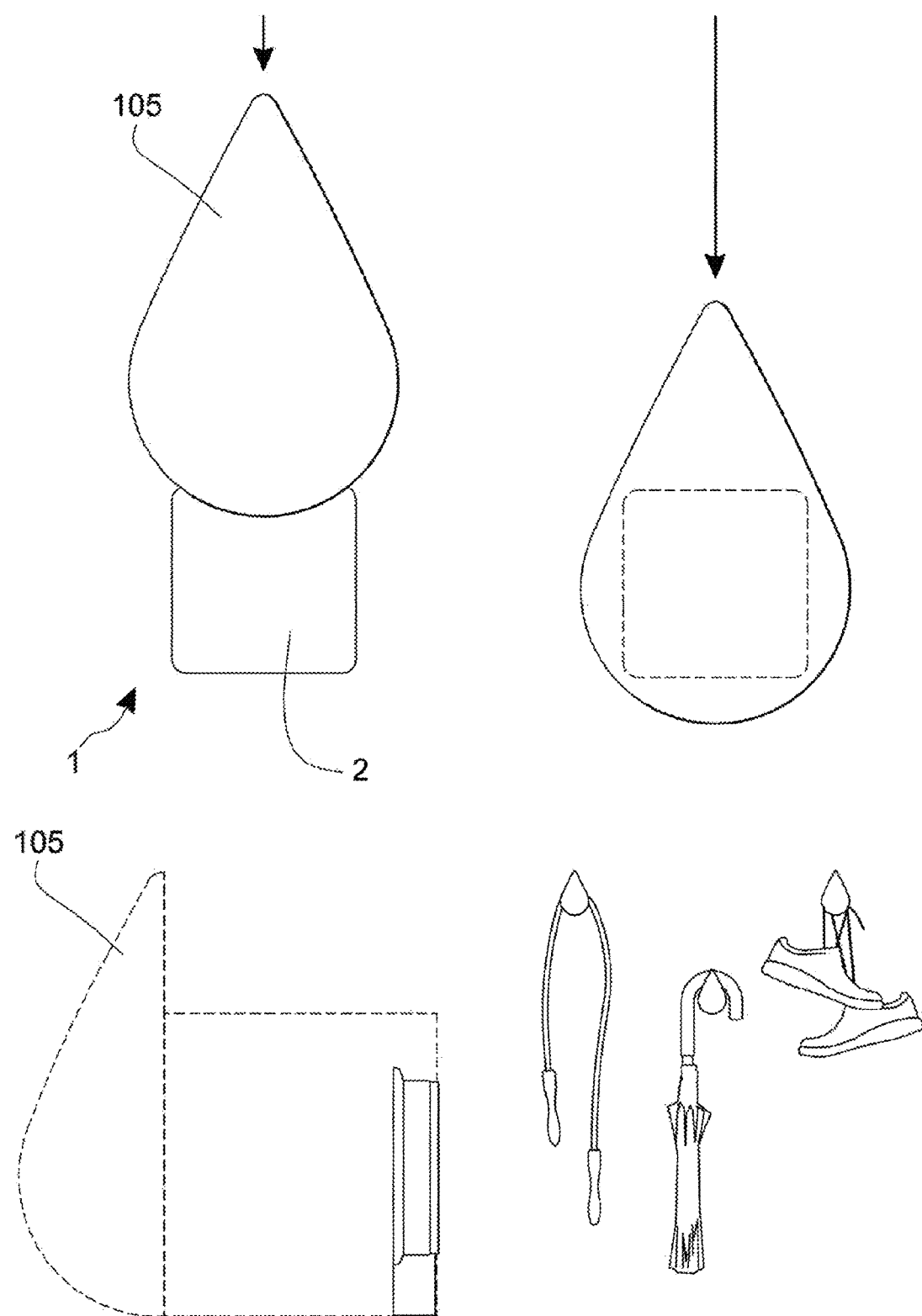
FIG. 7 depicts the device according to the invention together with a hook attachment.

FIG. 7 depicts one method of including a designer hook 105 onto an assembly of the present invention 1. The hook 105 is itself mounted onto the previously described device 1. This is to illustrate the fact that the hook 105 does not necessarily need to be screwed onto the cover 3 (as with the hook 8 depicted above). Rather, in this case, the hook 105 is simply slid downwardly onto the device 1 due to a corresponding notch provided on the device 1.

In fact, the device 1 is not limited to just hooks. Rather, the device 1 is to be considered to be a universal dock for different accessories such as hooks (either screwed 8 or non-screwed 105), LED light arrangements, clocks and magnetic pads for example. For instance, the cover 3 could itself be a magnetic material which would allow the attachment of ferrous items, such as keys or knives. Alternatively, the cover 3 could be a plastic or other material having a magnetic pad incorporated or attached thereon.

While square assemblies have been illustrated by way of example, it is to be appreciated that the invention is not limited to square assemblies. While it is preferred that the side edges of the device 1 be parallel, to enable the downward sliding attachment of the cover 3 to bracket 2, as described above, it is to be appreciated that the device 1 could nevertheless be elongated e.g. the device could be rectangular. This would allow for the use of more than two pins 5 in a horizontal direction, for example 3 pins 5 in a longer bridge 6.

Furthermore, devices of the invention 1 can be used in combination. Purely by way of example, two devices 1 of the invention could be mounted spaced apart horizontally on a mounting surface to provide supports, outstanding from the surface, to support a towel rail. Alternatively, the devices 1 can be used individually and can be mounted on a surface in any desired pattern, for example in combination with coat hooks such as those depicted in FIG. 1 (hook 8).

Figure 34A:
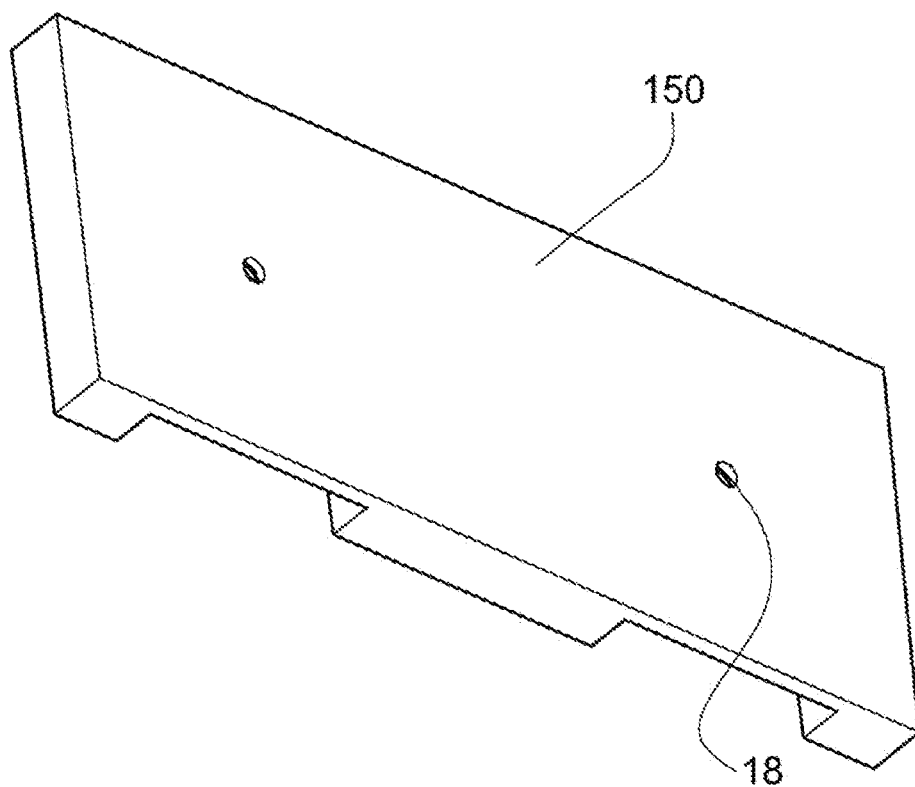
FIGS. 34A and 34B depict perspective views of a cover according to the present invention in front and rear configurations.
Figure 34B:
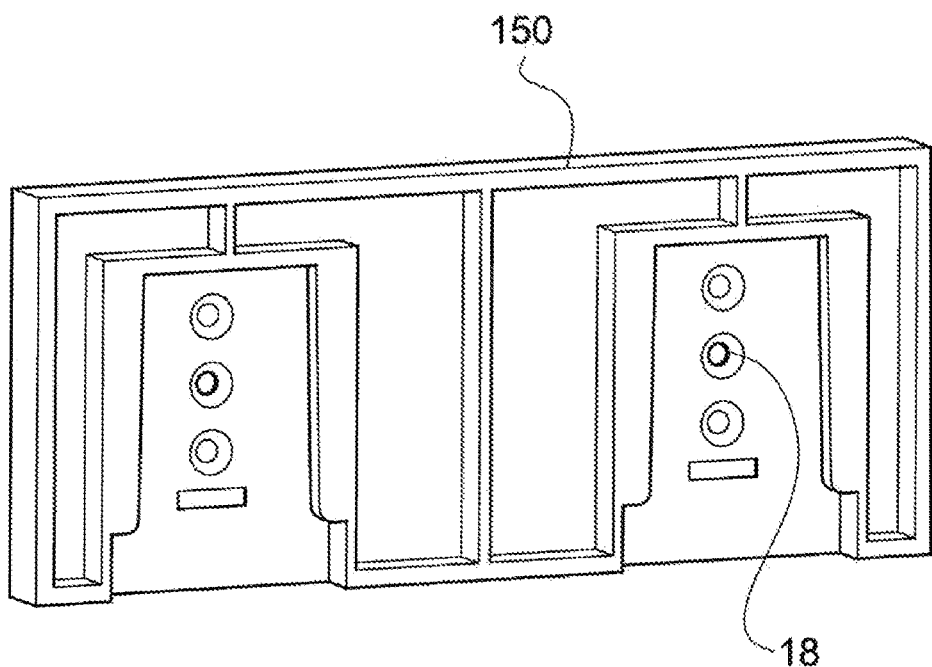

FIGS. 34A and 34B depict a cover 150 for use with the present invention. The cover 150, as depicted, may be attached to two brackets 2. Covers 150, attachable to more than two brackets are also envisaged. It can be appreciated that the more brackets 2 used to mount the cover 150, the more weight the cover will be able to support. It is envisaged that an object such as a toilet roll holder may be mounted to a mounting surface using such a cover 150, attachable to a plurality of brackets 2. It can be appreciated that use of more than one bracket 2, may be advantageous when mounting objects, such as a toilet roll holder, which undergo repeated uneven loading. In the case of a toilet roll holder, uneven loading results from the user pulling on the toilet roll. The use of more than one bracket 2, reduces the likelihood that objects we be detached from the mounting surface as a result of uneven loading.

Figure 35A:
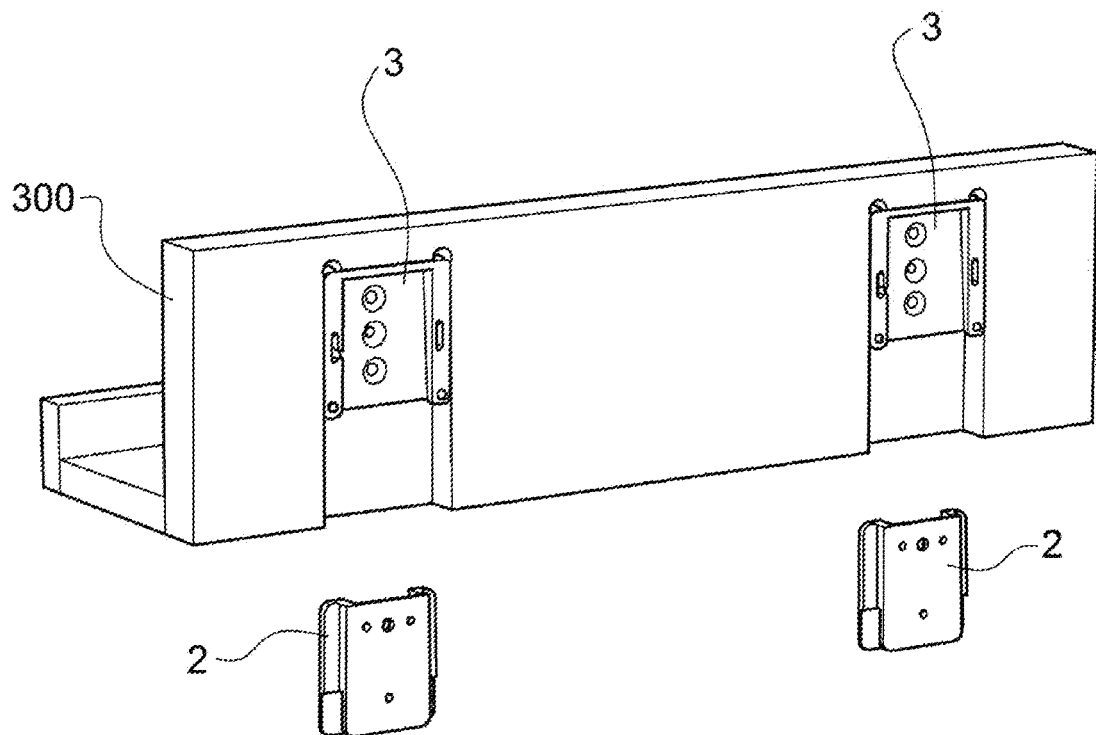
FIGS. 35A and 35B depict perspective views of a shelf used in connection with the present invention.
Figure 35B:
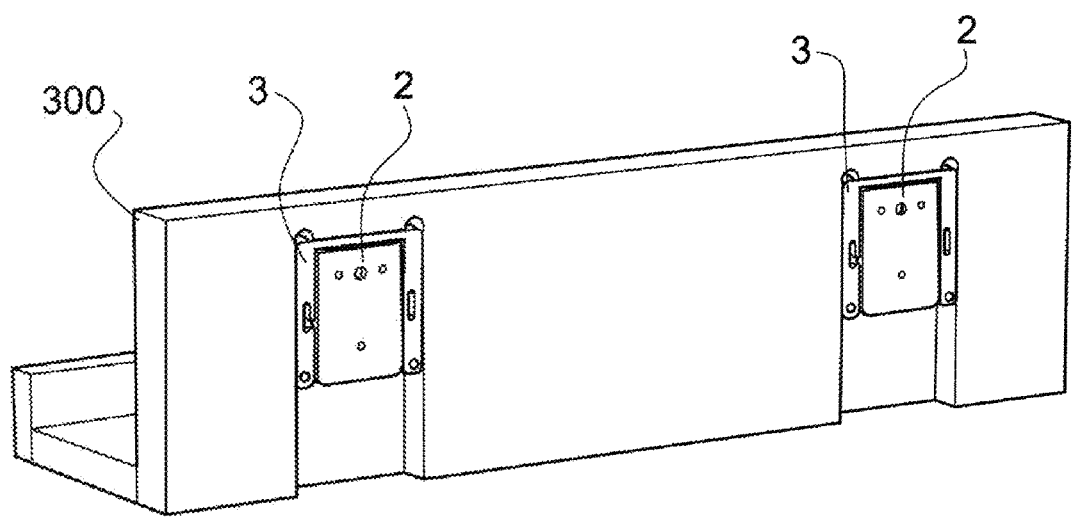

FIGS. 35A and 35B depict a shelf 300 for use with the present invention. As can be seen, the shelf 300 may be integral with one or more covers 3. A corresponding number of brackets 2 may be used to the mount the shelf 300 to a mounting surface. It can be appreciated that the greater the number of brackets 2 used to mount the shelf 300 to the mounting surface, the greater the amount of weight the shelf will be able to support.

Figure 36B:
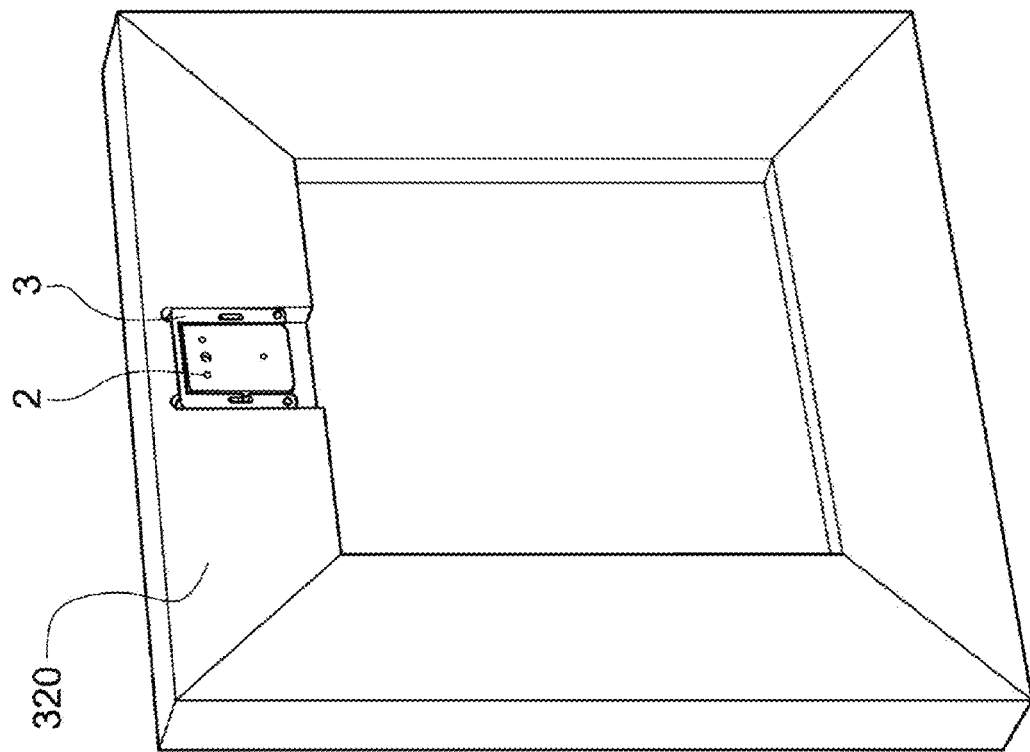
FIGS. 36A and 36B depict perspective views of a picture frame used in connection with the present invention.
Figure 36A:
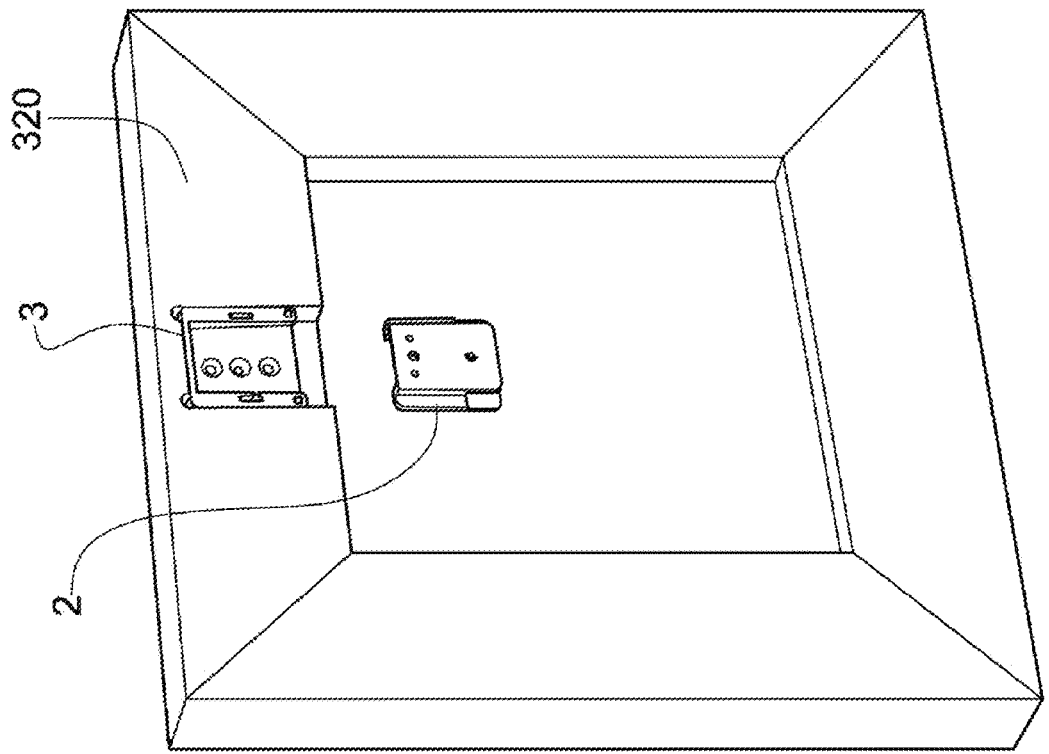

FIGS. 36A and 36B depict a picture frame 320 for use with the present invention. As can be seen, the picture frame 320 may be integral with a cover 3. In alternative arrangements, the picture frame 320 may be integral with more than one cover 3. A corresponding number of brackets 2 to the number of covers 3, comprised by the picture frame 320, may be used to mount the picture frame to a mounting surface. It can be appreciated that, once the picture frame is attached to the one or more brackets 3, the picture frame will rest flat against the mounting surface. It can also be appreciated that the picture frame 320 will be held securely in the desired orientation by the one or more brackets 2. This is advantageous over using a standard picture hook to mount a picture frame to a mounting surface. When mounted by a standard picture hook, a picture frame does not rest flat against the mounting surface and is not held securely in the desired orientation. As a result of the picture frame not resting flat against the mounting surface, the picture frame is more readily knocked by the user. Knocking the picture frame will likely cause the orientation of the picture frame to be altered. The user may be required to readjust the picture frame orientation each time this occurs.

As depicted, the cover 150, shelf 300 and picture frame 320 may be slidably attachable to one or more brackets 2.

Alternative arrangements of the shelf 300 and frame 320 are envisaged. For example, shelf 300 or frame 320 may be attachable to one or more covers 3, rather than integral to the one or more covers. The frame 300 or shelf 300 may be made of or comprise a magnetic material. One or more covers 3 comprising a magnetic pad may be used to mount said shelf 300 or frame 320 to a mounting surface.

Figure 33A:
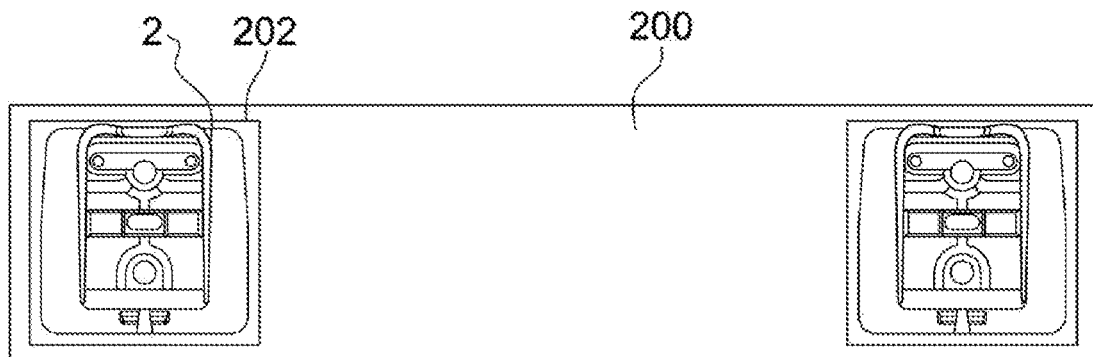
FIGS. 33A and 33B depict a template installer used in connection with the present invention.
Figure 33B:
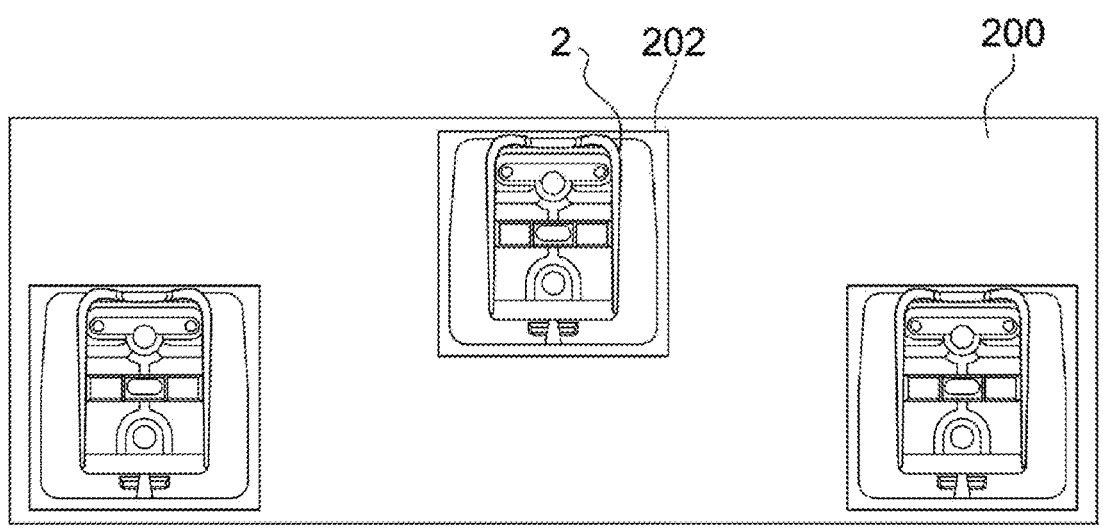

FIGS. 33A and 33B depict a template installer 200 for use with the present invention. Multiple brackets 2 may be sold together with the template installer 200. The template installer 200 can be made of foam, board, card or any other suitable material. The template installer 200 may comprise two or more openings 202 configured for receiving a bracket 2. The two or more openings 202 may be arranged within the template installer 200 so as to correspond to the desired mounting arrangement of a corresponding two or more brackets 2. For example, as depicted in FIG. 33A, the two or more openings 202 may be arranged linearly with the distance between the openings corresponding to the desired distance between the brackets 2 when secured to a mounting surface. As can be seen from FIG. 33B, various arrangements of the two or more openings 202 are possible.

It can be appreciated that the template installer 200 assists the user with correctly securing two or more brackets 2 to a mounting surface in instances where two or more brackets 2, in a specific arrangement, are required to mount an object to the mounting surface (e.g. such as when mounting the shelf 300 or using the cover 150). The two or more brackets 2 may be provided already received, in the correct mounting arrangement, in the template installer 200. The user may place the template installer 200 against a mounting surface and secure each of the two or more brackets 2 located within the template installer to the mounting surface using the adhesive pads 4. The template installer 200 may then be removed from the two or more brackets 2 by pulling the template installer 200 in a direction normal to the mounting surface. The two or more brackets 2 remain secured to the mounting surface after the template installer 200 has been removed. The two or more brackets 2 are thereby secured in the desired mounting arrangement without the user being required to secure each bracket separately or measure accurately the distance and angles between brackets before securing each bracket.

Returning now to adhesive pad 4, the adhesive pad 4, for mounting the bracket 2 to the mounting surface, may be removed from the mounting surface by alternately rotating the bracket 2 clockwise and anticlockwise. The inventors have found that, when attempting to remove the adhesive pad 4 from a painted surface, alternately rotating the bracket 2 clockwise and anticlockwise leads to removal of the adhesive pad 4 without substantially damaging the mounting surface such as by removal of paint from the surface. Further, application of heat to the adhesive pad 4 prior to rotation of the bracket 2, for example using a hairdryer, may further reduce the chance of damage to a painted surface.

Figure 8A:
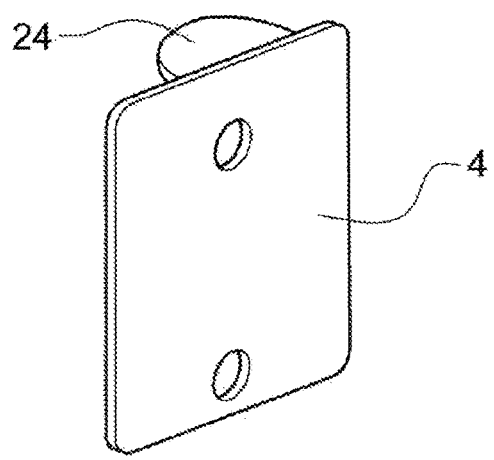
FIG. 8 depicts an adhesive pad used in connection with the present invention.

A further advantageous feature of the adhesive pad 4 is now described. It is known in the art to provide adhesive pads, suitable for use in connection with the present invention, having a release tag. Examples are the "Command" brand marketed by 3M and "Powerstrips" by tesa. An example is illustrated in FIG. 8. In this example, the adhesive pad 4 also includes a release tag 24.

When the user seeks to remove the device 1, including pad 4, from a surface, the user pulls upwardly (as shown) on the release tag 24, thereby stretching the adhesive pad and causing it to lose adhesion with the surface. Thus, the adhesive pad 4 is cleanly removed from the wall without damage. The release tag 24 may be a separate material from the adhesive pad 4 or it may simply be an extension of the adhesive pad 4, optionally covered with remaining release liner which is not removed by a user.

Figure 8B:
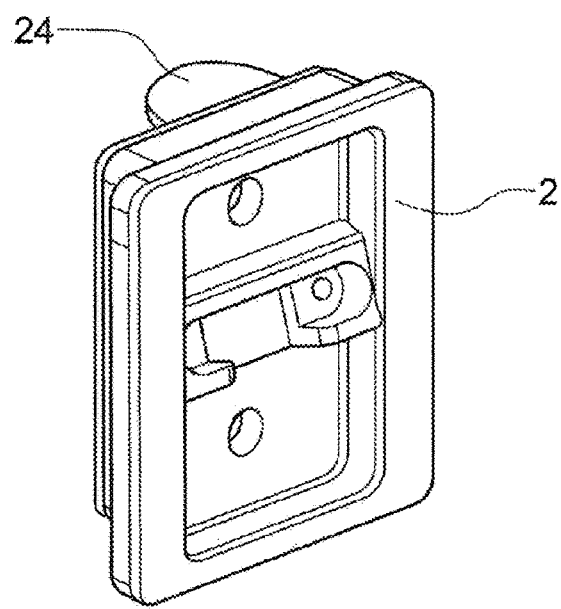
Figure 8C:
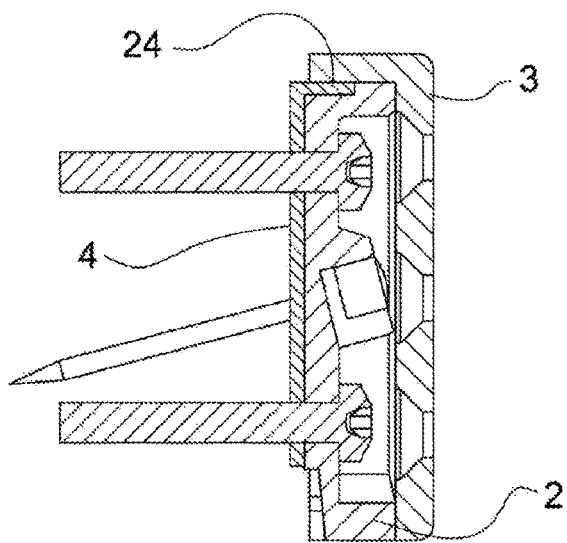

One disadvantage of such release tags 24, as known in the art, is that they may be visible in use and may be unsightly. For example, in order for the release tag 24 to be later manipulated by a user, it needs to be accessible and visible and therefore may protrude from the picture being mounted, which is unsightly. The present invention solves that problem because the release tag 24 is hidden in use by the cover 3. As illustrated in FIG. 8B, when the adhesive pad 4 is initially mounted to the bracket 2 the release tag 24 is visible. However, after the cover 3 is slid down onto the bracket 2, as illustrated in FIG. 8C, the release tag 24 becomes bent over the top of the bracket 2 and is thereby hidden by the top surface of cover 3, being sandwiched between the top edge of the bracket and the upper face of the cover. Thus, the release tag 24 is not visible in use.

Figure 9:
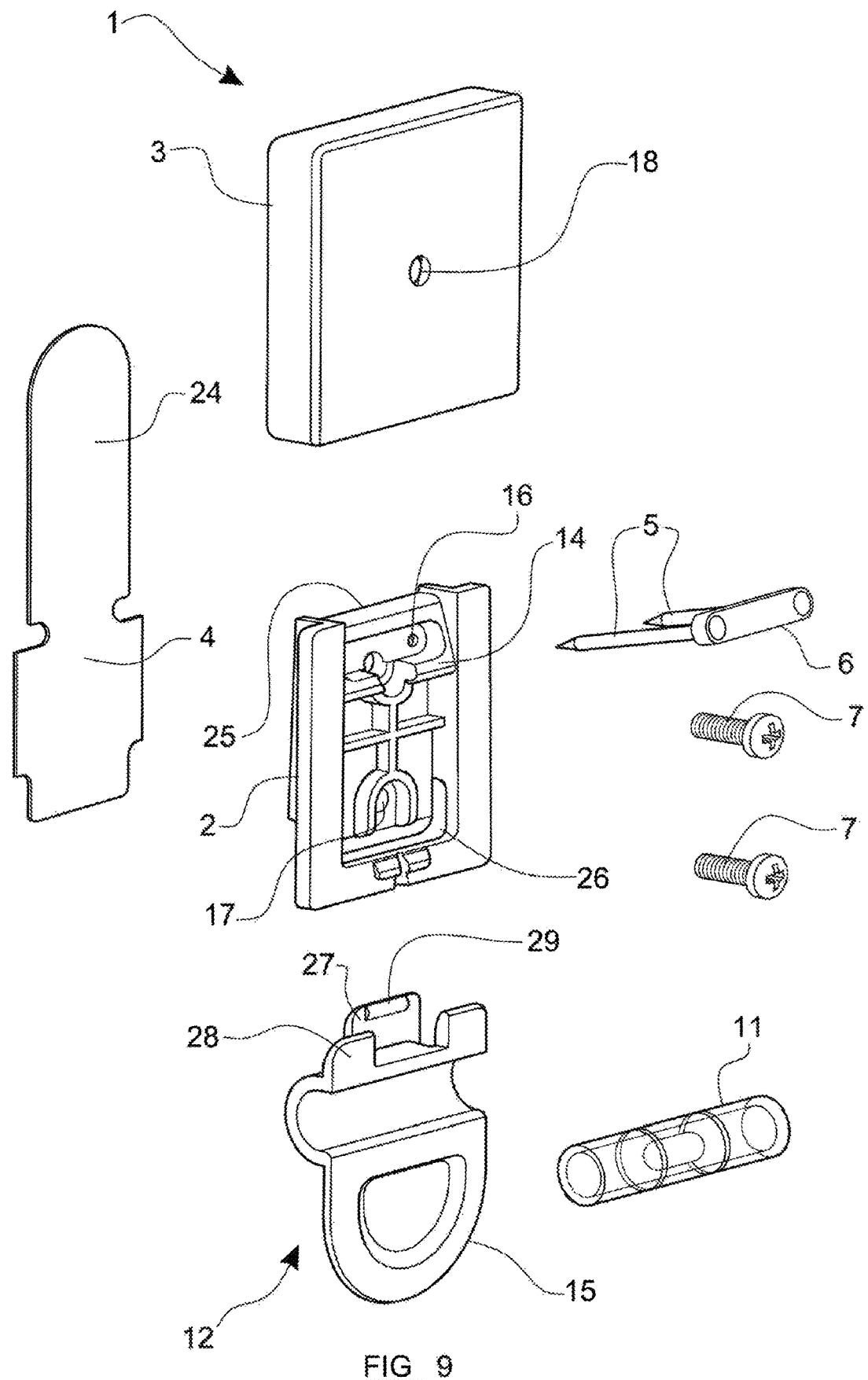
FIG. 9 is a perspective exploded view of a further device according to the invention, from the front side.
Figure 10:
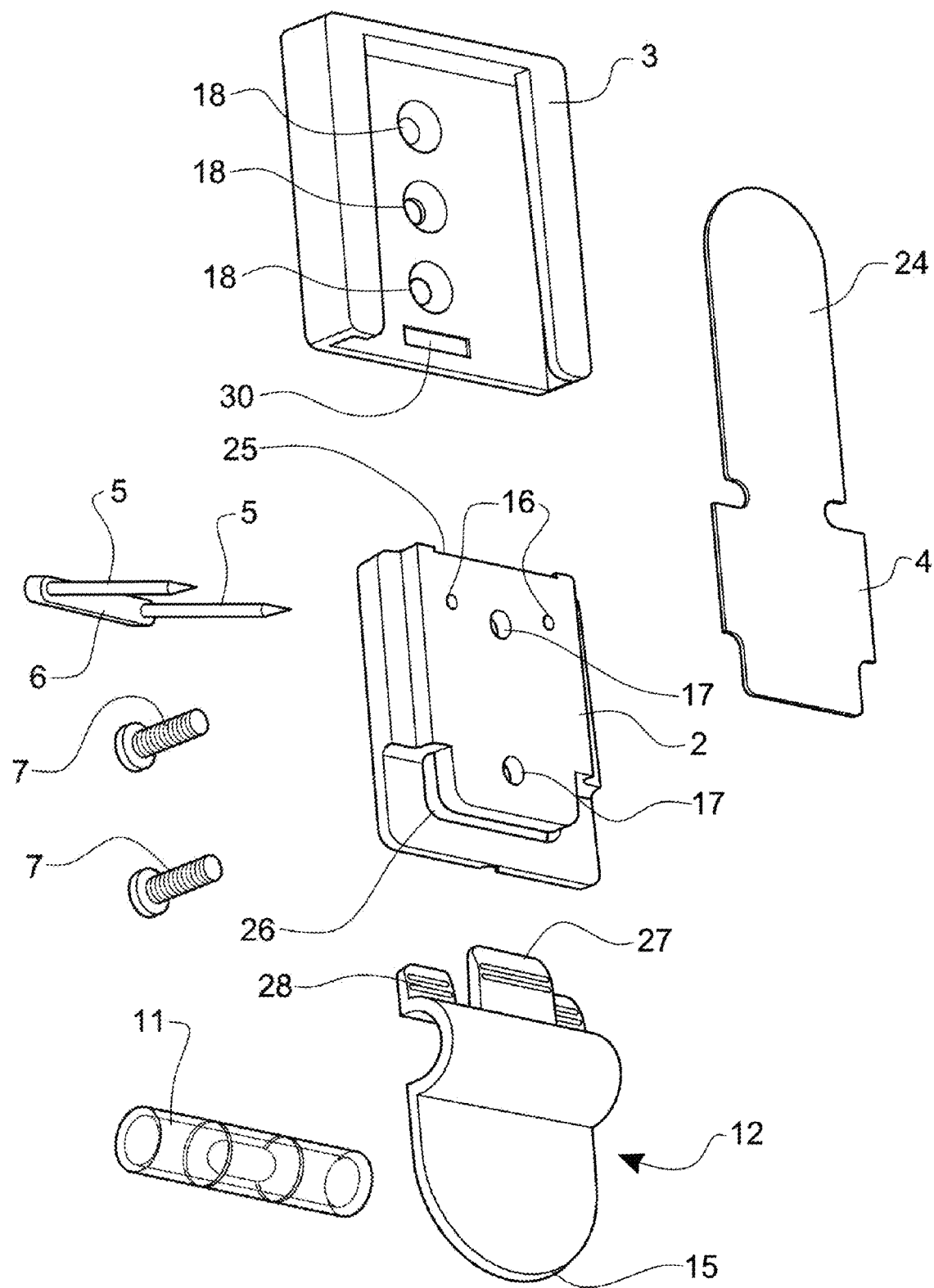
FIG. 10 is a perspective view of the device of claim 9, from the reverse side.

FIG. 9 depicts a device 1 according to the present invention which, in many respects, is identical to that of FIG. 1 and therefore corresponding reference numerals are used. The arrangement of FIG. 9 shows the adhesive pad 4 with release tag 24 just described. In the arrangement of FIG. 9, the pin holes 16 and abutment 14 are provided higher up vertically on the bracket 2. In fact, the pin holes 16 can be provided anywhere in the bracket. The arrangement depicted in FIGS. 9 to 15 includes some additional features not shown in FIGS. 1 to 8. However, it is to be appreciated that all of the depicted devices fall within the scope of the present invention and any of the features depicted in any of the drawings may be combined together in one and the same device.

One such additional feature depicted in FIG. 9 is a slot 25 provided in the top surface of the bracket 2. Slot 25 allows the release tag 24 of the adhesive pad 4 to be looped over the top of the bracket 2 toward the front surface of the bracket in order to be hidden by the cover 3, as shown in FIG. 12. In other words, the slot 25 provides space for the thickness of the release tag 24.

Figure 13:
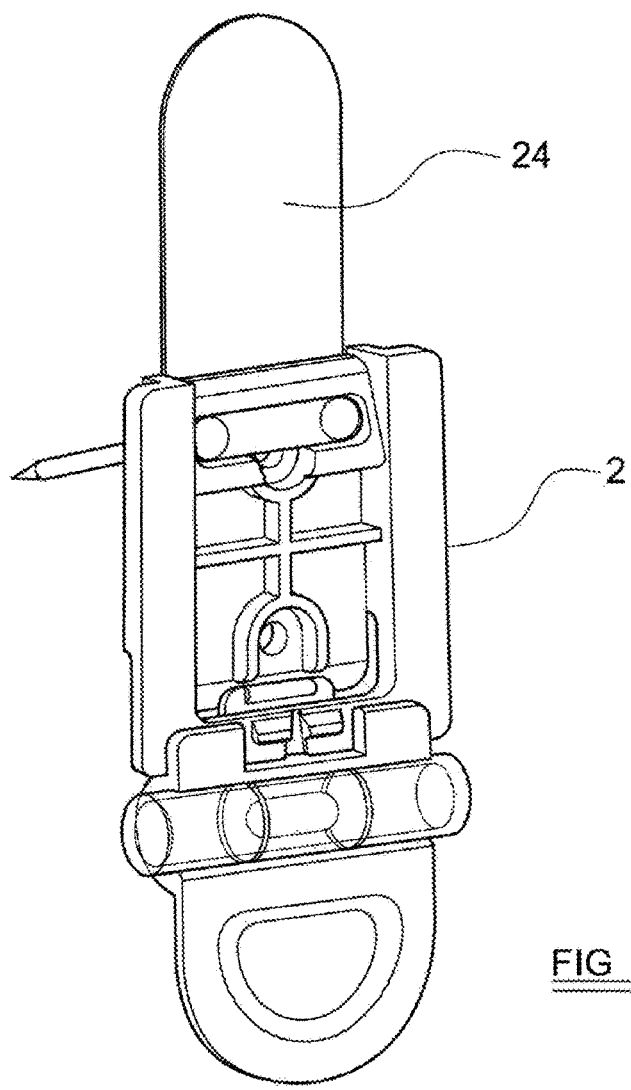
FIG. 13 is a perspective view showing the device of FIG. 12 in an alternative configuration.

It can also be seen from FIGS. 9 to 11B that the bracket 2 additionally includes a cut-out 26 in the front face of the bracket. This is to assist with mounting of the spirit level clip 12. Here, the spirit level clip 12 (depicted in FIG. 9) includes at least one prong 27 and a wall 28. As will be appreciated, the prong 27 passes up into the cut-out 26 to allow the clip 12 to clip into place. The prong 27 may be resilient so that it may deform as it passes into the cut-out 26 and provide a positive force to keep clip 12 in place, in the manner of a snap or interference fit. Furthermore, the prong 27 is depicted as having a button 29 which, due to the resilient nature of prong 27, flexes over the cut-out 26 so as to maintain the clip in position. A front wall 28 maintains the position of the clip on the front face of the bracket 2. Here, the wall 28 is depicted with a central aperture to make space for other components which will be later described. FIG. 13 shows an arrangement of the invention with the spirit level clip 12 in place in which the prong 27 has passed through cut-out 26 in the manner previously described.

The arrangement shown in FIGS. 9 to 15 has a slightly different way of mating the cover 3 to the bracket 2. As can be seen from FIG. 10, the cover 3 has a recess 30 which is an indentation on the inside wall of the front face of the cover 3.

Figure 11A:
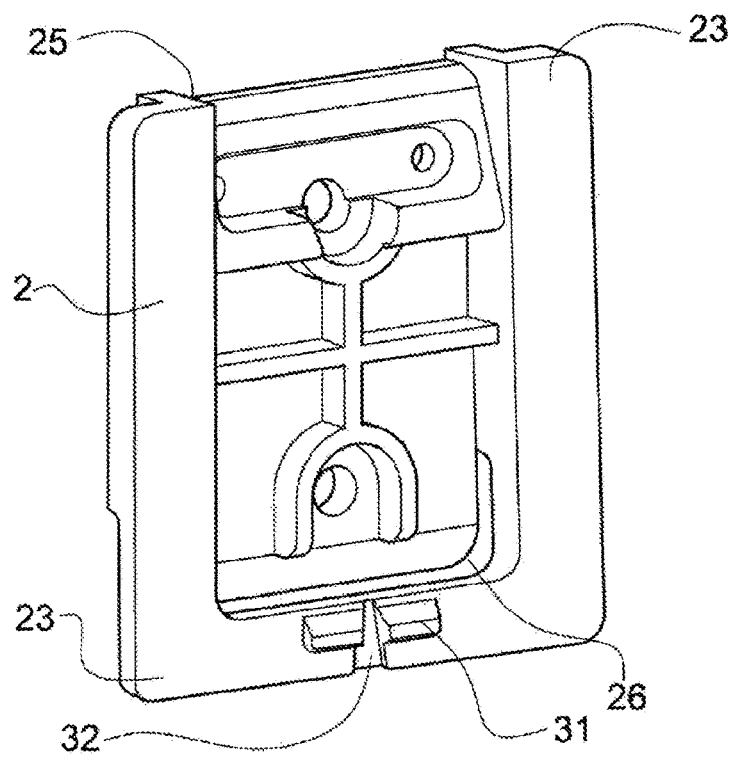
FIGS. 11A and 11B are perspective views from the front and from the rear of a bracket which is part of the present invention.
Figure 11B:
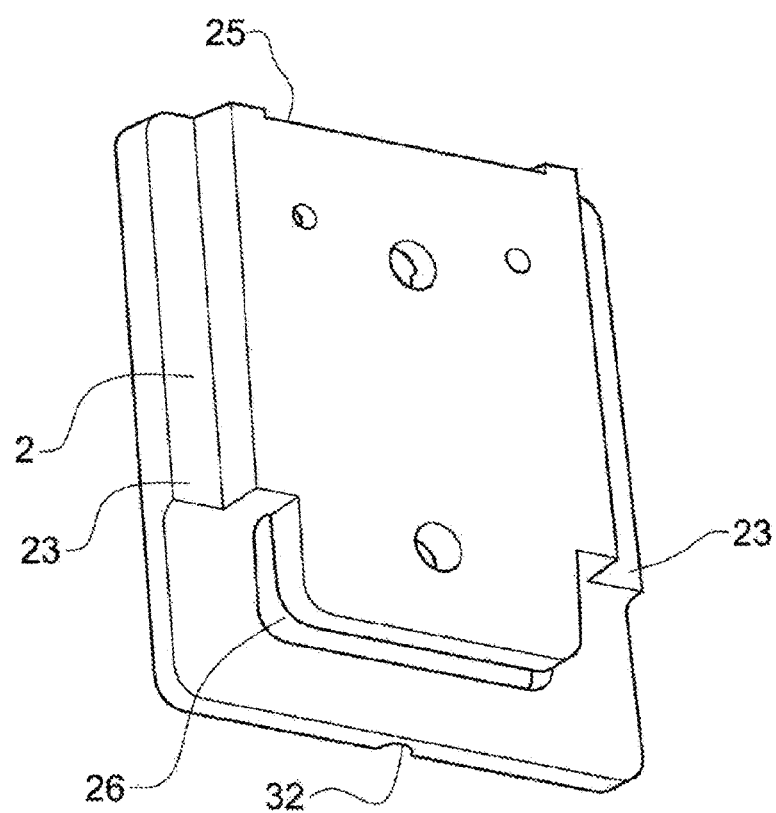

In a corresponding spatial position on the bracket 2, the bracket 2 is provided with an upstanding lip 31 (see FIG. 11A). It is to be appreciated that when the cover 3 is slid down onto the bracket 2 in the manner previously described, the lip 31 will be urged into the cover recess 30, thereby locking the cover 3 in place on the bracket 2 in a snap-fit arrangement. It can also be seen from FIGS. 11A and 11B that both the lip 31 and the bottom edge of the bracket 2 are provided with a depression 32, such that the lip 31 is divided into two parts. The function of the depression is to release the cover 3 from the bracket 2, as shown in FIG. 14.

Figure 14:
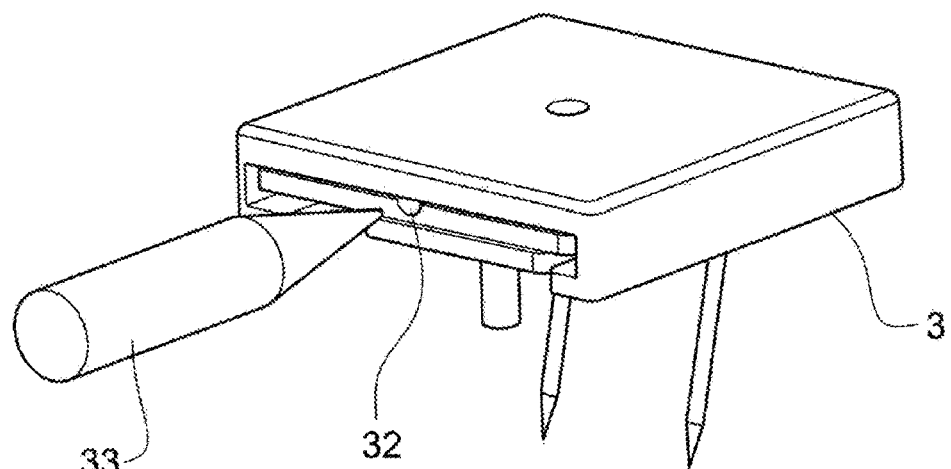
FIG. 14 is perspective view of a device according to the invention.
Figure 15:
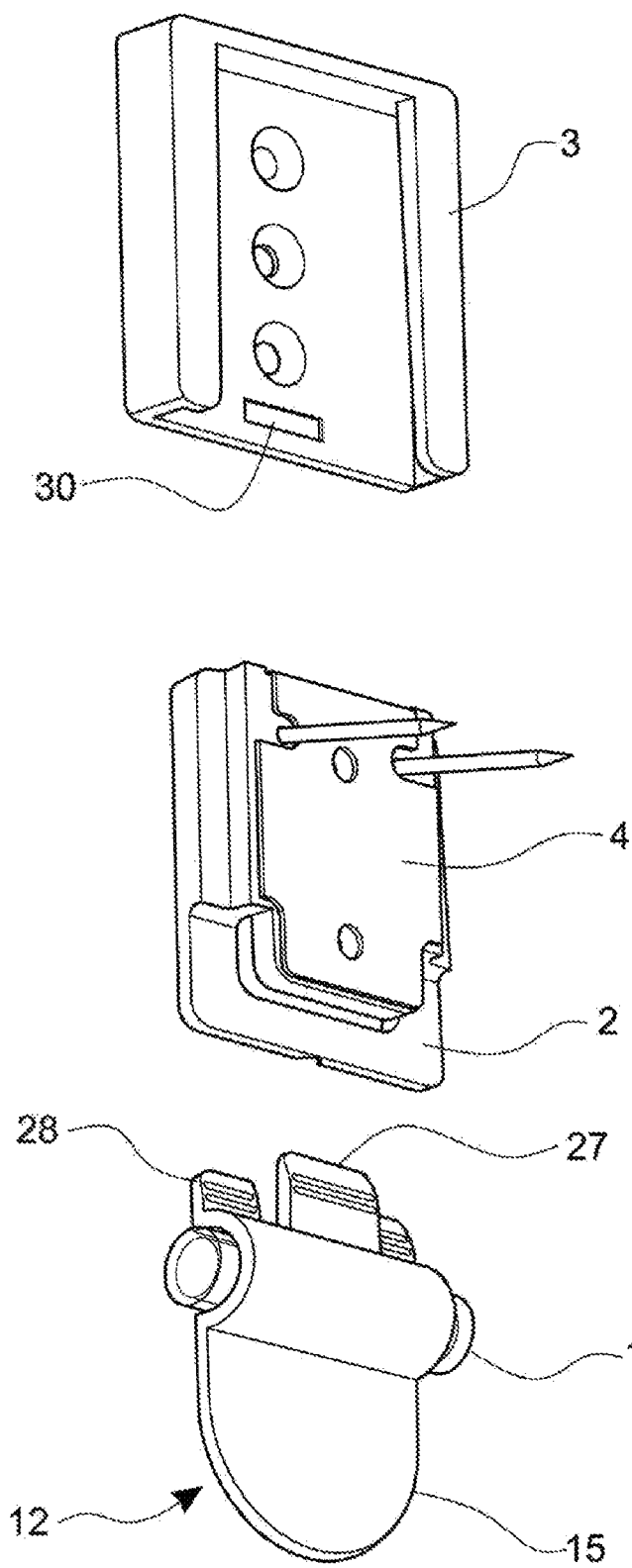
FIG. 15 is a perspective view equivalent FIG. 12 but from the reverse side.

FIG. 14 shows an item, such as a pencil or other pointed object, being pushed into the depression 32. As the object 33 is pushed into the depression 32 it will meet with the part of the cover recess 30 adjacent to the depression 32. Applying pressure to the pencil or other object 33 therefore pushes the cover recess 30 away from the lip 31, thereby releasing the cover 3 from bracket 2. In this manner, the cover is released from the bracket without needing a special tool or key. The user can simply use any pointed item such as a pencil, screwdriver, pen etc.

It is to be appreciated that a kit may be provided to a user, the kit including some or all of the components discussed herein. For example, it is to be appreciated that the kit could include a base 2, a cover 3, pins 5 and bridge 6. Screws 7 are optional in the kit because screws 7 could be purchased separately and are not essential to the invention. The kit can be provided with or without the spirit level 11 together with its clip 12. Where necessary, the kit can include a release key 10 for releasing the cover 3 from the bracket 2. The kit can also include, for example, a hook 8 together with attachment screw 9. Alternatively, different attachments could be provided together with respective attachment screws 9. Preferably, the user could purchase a kit comprising the elements essential to the invention together with a number of different attachments which could be mounted on the cover 3 depending on the user's preference.

Figure 16:
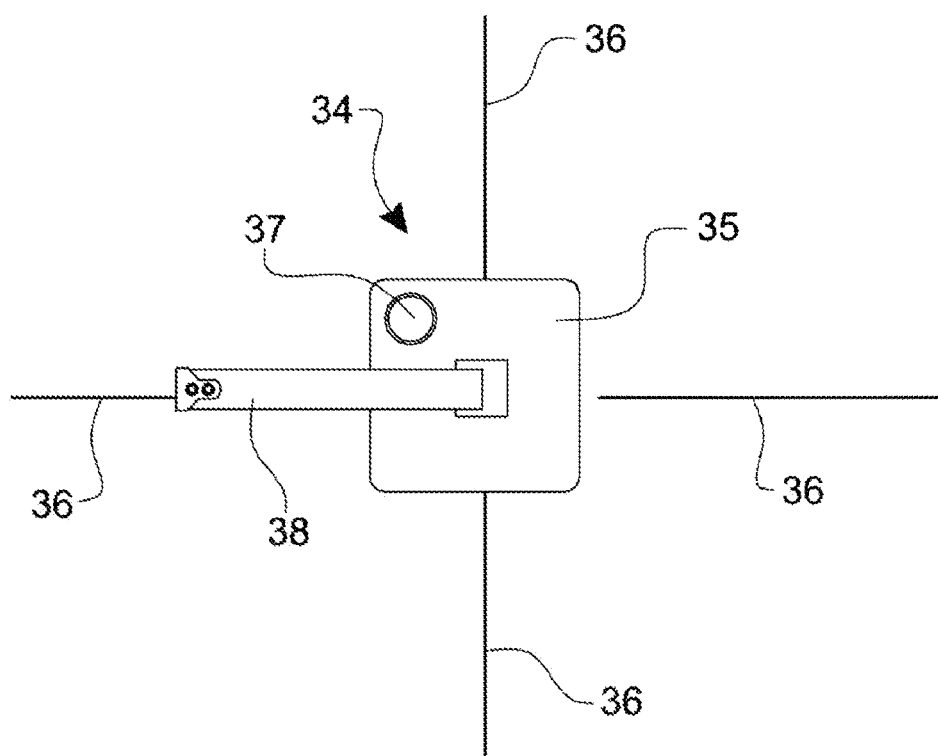
FIG. 16 is a plan view of a kit for use with the present invention.

FIGS. 16 and 17 illustrate examples of attachments for use in connection with the present invention. FIG. 16 illustrates a gallery kit 34 which comprises a gallery kit housing 35. It is to be appreciated that the gallery kit housing 35 may be an object to be attached to a cover 3 according to the present invention. Alternatively, the gallery kit housing 35 could be integral with the cover 3 of the invention. In other words, a rear face (not shown) of the gallery kit housing 35 could comprise all of the features previously described of the cover 3 for connection to a bracket 2 according to the invention.

The gallery kit 34 is intended to assist a user in keeping mounted objects (for example paintings) in line with each other, for example when installing paintings on a gallery wall. The gallery kit 34 includes means for projecting laser beams 36 horizontally and/or vertically from the gallery kit housing 35. Operation of said laser beams is controlled by the on/off switch 37. In use, a user installs a bracket 2 according to the invention in a straight manner, preferably using a spirit level arrangement as previously described herein. The gallery kit housing 35 is then mounted to the bracket 2 and the laser beams 36 guide the user in positioning paintings in a horizontal and/or vertical alignment.

The gallery kit 34 further optionally comprises a tape measure 38 which may be retracted from the gallery kit housing in a horizontal and/or vertical direction (horizontal as shown). This is to enable a user to accurately determine distances between the mounted objects, for example paintings. It is to be appreciated that this tape measure 38 can be a type of tape measure known in the art, for example a flexible metal or flexible material tape measure which may be retracted using methods known in the art, for example winding mechanisms and/or springs.

The gallery kit housing 35, may advantageously be configured to house one or more batteries for powering the laser beam 36.

Figure 32A:
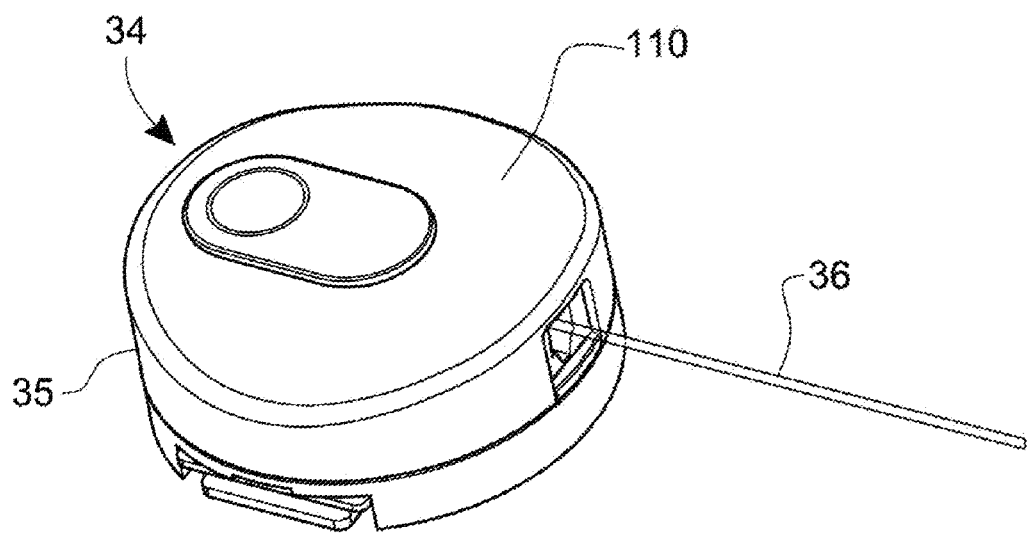
FIGS. 32A and 32B depict perspective views of a device according to the present invention.
Figure 32B:
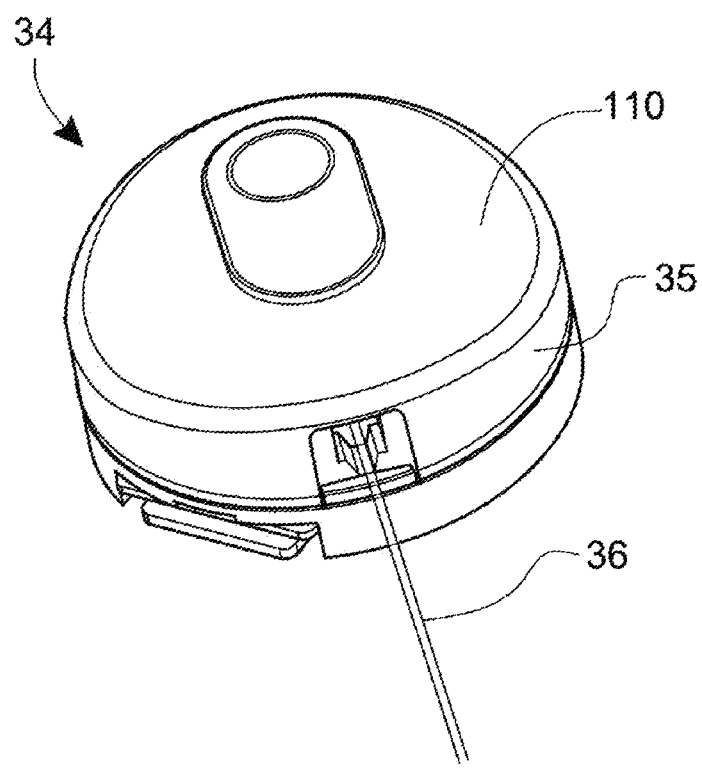

In a particularly advantageous arrangement, the gallery kit housing 35 may comprise a rotatable front portion 110. The rotatable front portion 110 may be rotated by the user by pre-set angles, for example 45, 90, 180 degrees etc. from its starting position. Rotation of the rotatable front portion 110 may cause rotation of the laser beam 36. Rotation of the laser allows the user to mount multiple objects at various angles compared to the gallery kit 34. An example gallery kit 34 comprising a rotatable front portion 110, is depicted in FIGS. 32A and 32B. FIG. 32A shows the gallery kit 34 mounted with the rotatable top portion 110 in its starting position. FIG. 32B shows the gallery kit 34 after rotation of the rotatable top portion 110 by 45 degrees.

FIG. 17 illustrates an integral hook 39 for use with the present invention. In this example, rather than attaching a hook 8 to cover 3 (as shown in FIG. 1, for example) the hook 39 is integral with the cover 3, as previously described. In other words, the integral hook 39 also acts as the cover 3 and includes all of the features of the cover 3 previously described. The integral hook 39 further comprises an upwardly curved section 40 for use in hanging objects.

Figure 17C:
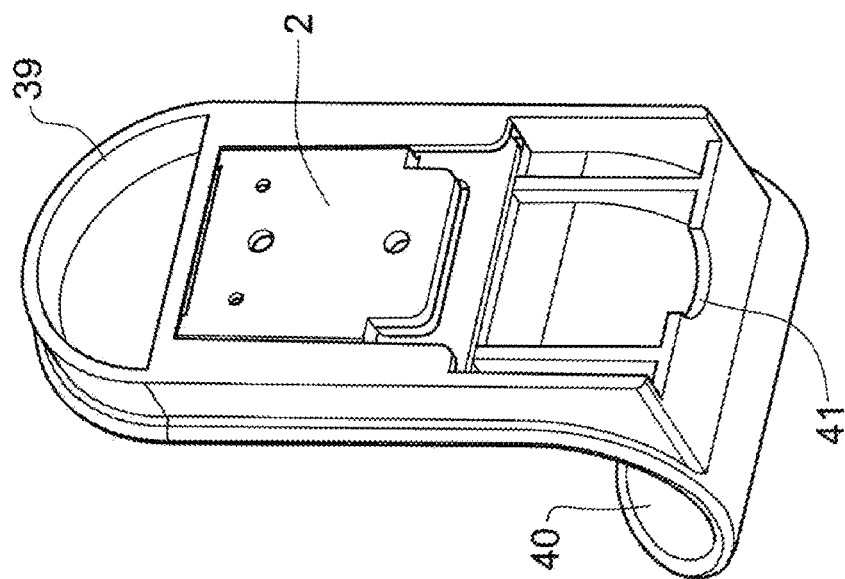
FIG. 17 shows perspective views of an integral hook for use with the present invention in front, rear and mated configurations.
Figure 17B:
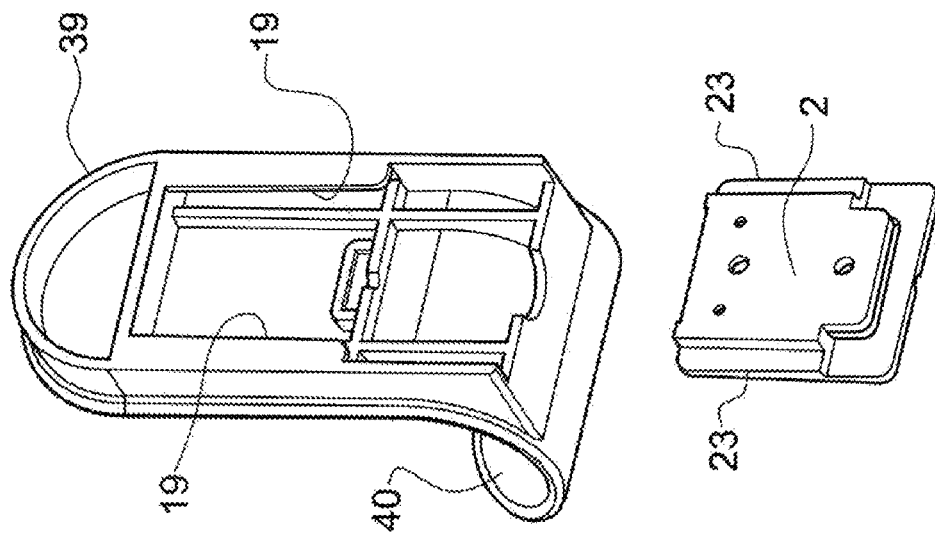
Figure 17A:
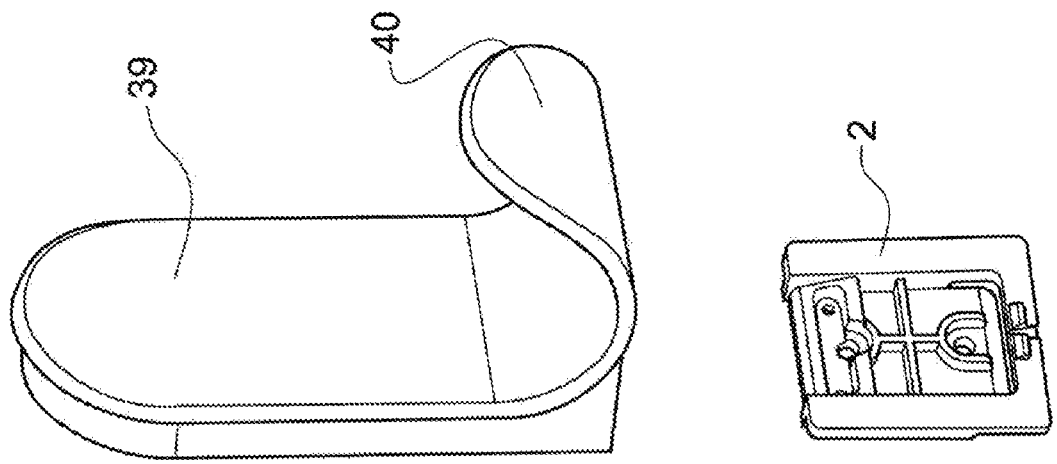

As shown in FIG. 17A, the integral hook 39 is to be mated with a bracket 2 according to the present invention as previously described (the bracket 2 is the same bracket illustrated in FIGS. 9 to 15 above but it is to be appreciated that the bracket 2 could be the same bracket illustrated in FIGS. 1 to 8).

In FIG. 17B, bracket 2 includes rails 23, as previously described, which are intended to be engaged with grooves 19 of the cover 3 of integral hook 39. The parts of the integral hook 39 and bracket 2 which mate with each other are identical to those already described.

As shown in FIG. 17C, in the engaged position, the integral hook 39 has been slid downwardly onto the bracket 2 (combination of grooves 19 and rails 23) so that the bracket 2 is seated within the integral hook 39. It can be seen that the integral hook 39 is also provided with a hook cut-out 41 at the bottom face of the hook 39. This is to allow upward insertion of an object such as a pencil 33 to release the mated bracket 2 and integral hook 39, as previously described.

Figure 18A:
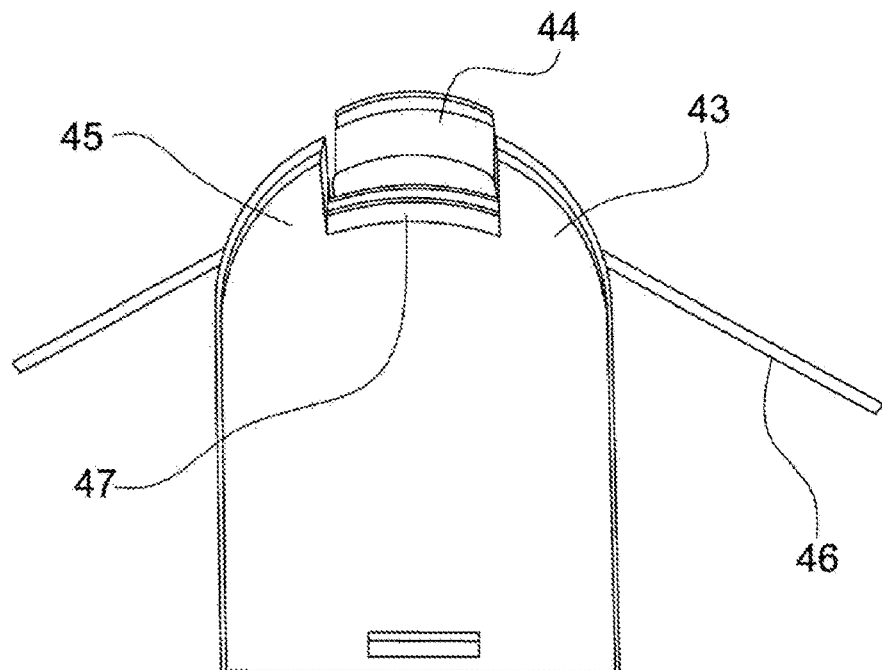
FIGS. 18A and 18B show perspective views of an alternative integral hook for use with the present invention in front and rear configurations.
Figure 18B:
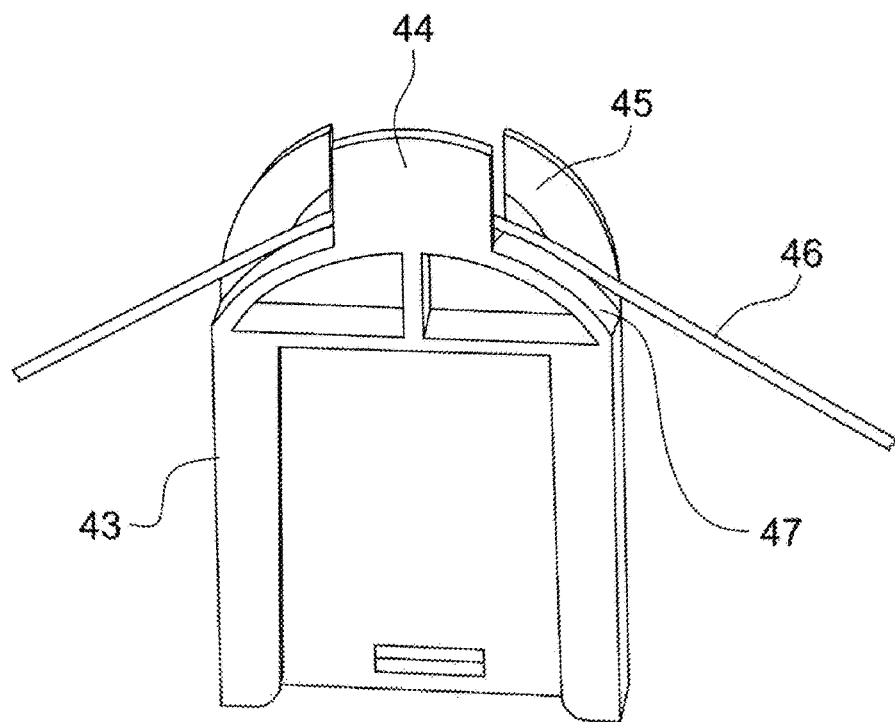

FIGS. 18A and 18B depict an alternative integral hook 43 for use with the present invention. In this example, the integral hook has a curved upper surface 47, a rear wall 44 extending upwardly from a rear edge of the upper surface 47, and front walls 45 extending upwardly from a front edge of the upper surface 47. In use, a picture wire or the like 46 may be placed on the upper surface 47, between the rear wall 44 and front walls 45, allowing an object to be hung from the device 1. The front walls 45 and rear wall 44 prevent the picture wire or the like 46 from slipping off the device 1. Although an arrangement with two front walls and one rear wall is depicted, alternative arrangements are envisaged, for example an integral hook 43 with a single front wall 45 and no rear wall.

The integral hook 43, as depicted in FIGS. 18A and 18B, includes all of the features of the cover 3 for mating with the bracket 2, as previously described. It can be appreciated that a curved upper surface 47 is preferable to a flat surface for supporting a picture wire or the like.

FIGS. 20A to 20D depict a further integral hook 54 for use with the present invention. In this example, the cover 3 comprises an integral hook 54 slidable between a first position, in which the hook does not protrude from the front surface of the cover, and a second position, in which the hook protrudes from the front surface of the cover. FIG. 20C shows a side view of a device of this arrangement with the hook 54 is in the second position, while FIG. 20D shows a side view of a device of this arrangement with the hook 54 in the first position. The hook 54 may be manually slid from the second to the first position when the hook is not in use. As depicted in FIGS. 20A and 20B, a finger depression 58 may be provided on the front surface of the cover 3 adjacent to the hook 54, so that the user may readily grip and slide the hook between the first and second position.

The hook 54 in the second position provides an aperture 56 for receiving part of an object to be mounted, as depicted in FIG. 20A. The object 50 depicted is a mounting element for a painting or picture, as known in the art, and comprises a series of teeth 52. One or more of the teeth 52 may engage with aperture 56 of hook 54. It can be appreciated that by providing an aperture 56 with which the teeth 52 of object 50 can engage, the object is held more securely by the hook 54. Accordingly this aspect of the invention allows for the secure mounting of pictures or paintings (for example) which have been prepared for mounting with a toothed mounting element 50.

Just like the arrangement shown in FIGS. 18A and 18B (hook 43) the cover 3 of the FIG. 20A to 20D arrangement may also be provided with means for mounting a picture wire, such as a curved upper surface 47. While this is depicted in FIGS. 20A to 20D together with the hook 54, it is to be appreciated that it is not mandatory to provide both, though it may be preferable in order to provide more options to the consumer in a single device.

It is to be appreciated that these are just example attachments. One aspect of the present invention is that the invention provides a universal bracket 2 which can be mated with many different sorts of cover 3, not limited to the cover 3 illustrated in the figures. As already described, the cover 3 can itself have means for attaching a further object (such as a hook 8), or the cover can be made integral with the object, for example integral hook 39.

Figure 21:
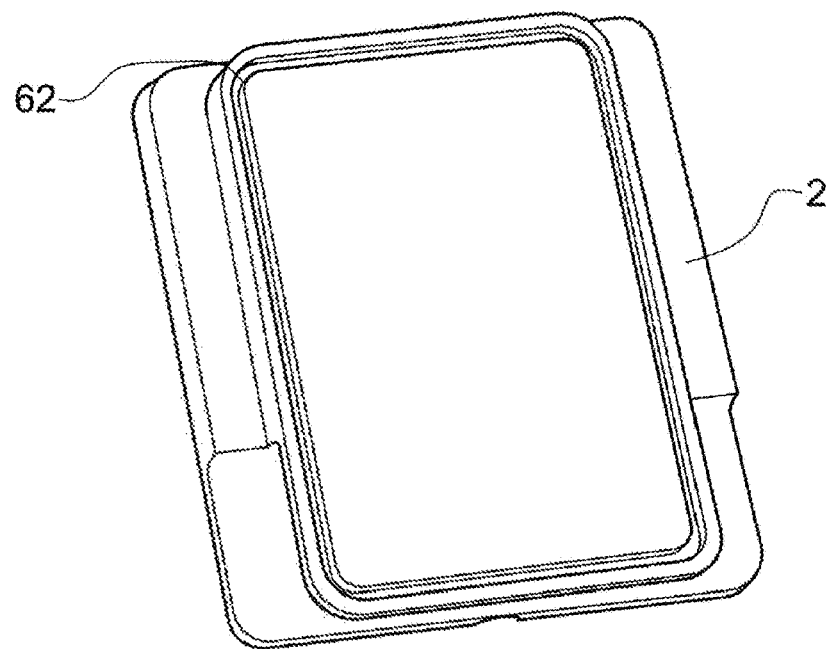
FIG. 21 shows a perspective view of a bracket according to the present invention.
Figure 22:
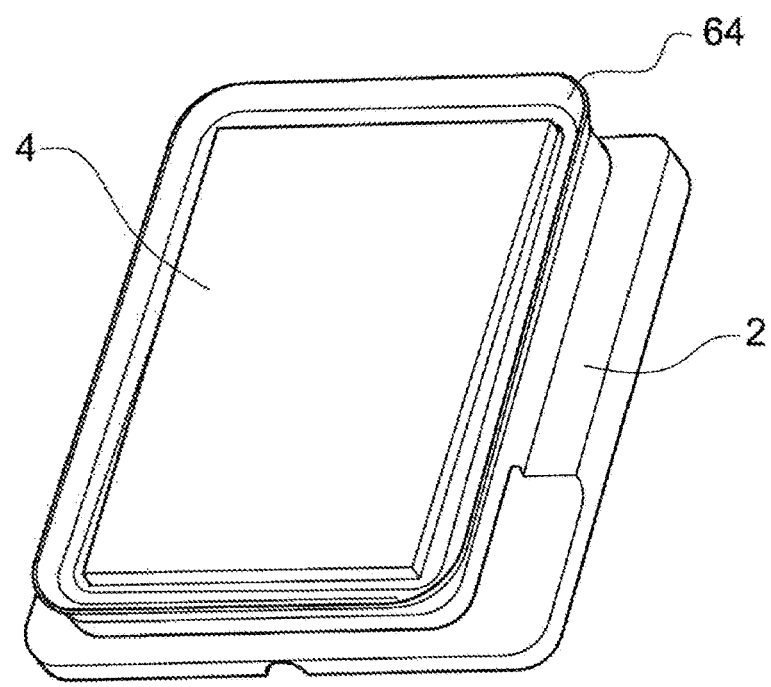
FIG. 22 shows a perspective view of a bracket according to the present invention.

FIG. 21 depicts the rear surface of a bracket 2 of an alternative arrangement the present invention. The rear surface of the bracket 2 may comprise a circumferential trench 62. Preferably, the trench 62 may extend along the perimeter of the rear surface. As depicted in FIG. 22, the trench 62 may be over-moulded with a sealing element 64. The sealing element 64 may be of any suitable material, such as silicone. It is to be appreciated that the sealing element 64 should be flexible and of a water-resistant material, since the arrangement is intended to be used in a bathroom or kitchen environment, or the like.

The bracket of FIG. 22 may be attached to the mounting surface by means of the adhesive pad 4. FIGS. 23A and 23B show cross-sectional views of a mounting device comprising a sealing element 64 in contact with a mounting surface, which may be for example a bathroom or kitchen tile. FIG. 23A depicts the sealing element 64 in an uncompressed position. FIG. 23B depicts the sealing element 64 in a compressed position, wherein the adhesive pad 4 is in contact with the mounting surface.

It can be appreciated that a sealing element 64 is advantageous in mounting devices intended for attachment to kitchen and bathroom mounting surfaces, such as tiled walls. The sealing element 64 prevents water ingressing the bracket 2 and contacting the adhesive pad 4 and thereby reducing the adhesion strength between the adhesive pad and the mounting surface.

Additionally, as depicted in FIG. 21, the bracket 2 may lack picture pin or screw apertures. It can be appreciated that the lack of such apertures further reduces the likelihood of water contacting the adhesive pad 4. Furthermore, it is undesirable to provide screws and pins for mounting on a tiled surface, such as is commonly found in kitchens and bathrooms, because the screws and pins would permanently damage the tile.

As depicted in FIGS. 21 and 22, the trench 62 and sealing element 64 may preferably extend around the entire perimeter of the rear surface of the bracket 2. In such an arrangement, the sealing element 64 may, as described below, provide a vacuum sealing effect or near or partial vacuum sealing effect.

As seen in FIG. 23A, in arrangements wherein the sealing element 64 extends around the entire perimeter of the bracket, after bringing the sealing element 64 into contact with the mounting surface, a sealed (air tight) cavity 66 is created between the rear face of the bracket, the mounting surface and the sealing element 64. The user may next apply pressure to the front surface of bracket 2, normal to the mounting surface. This pressure causes the sealing element 64 to deform outwardly, or splay from the uncompressed to the compressed position and air to be expelled from cavity 66, creating a vacuum or near or partial vacuum within cavity 66. Application of this pressure also brings the adhesive pad 4 into contact with the mounting surface, as can be seen in FIG. 23B, where, due to the expulsion of air, the part of cavity 66 which was adjacent to adhesive pad 4 is entirely removed.

It can be appreciated that the pressure difference between cavity 66 and the atmosphere in such an arrangement may, in addition to the adhesion of the adhesive pad 4, help hold the mounting device attached to the mounting surface. The enhanced the strength of the connection between the bracket and the mounting surface is advantageous for mounting on a tiled surface, where it is undesirable to provide an additional mounting means such as a screw or nail through the tile, which would permanently damage the tile.

Figure 30A:
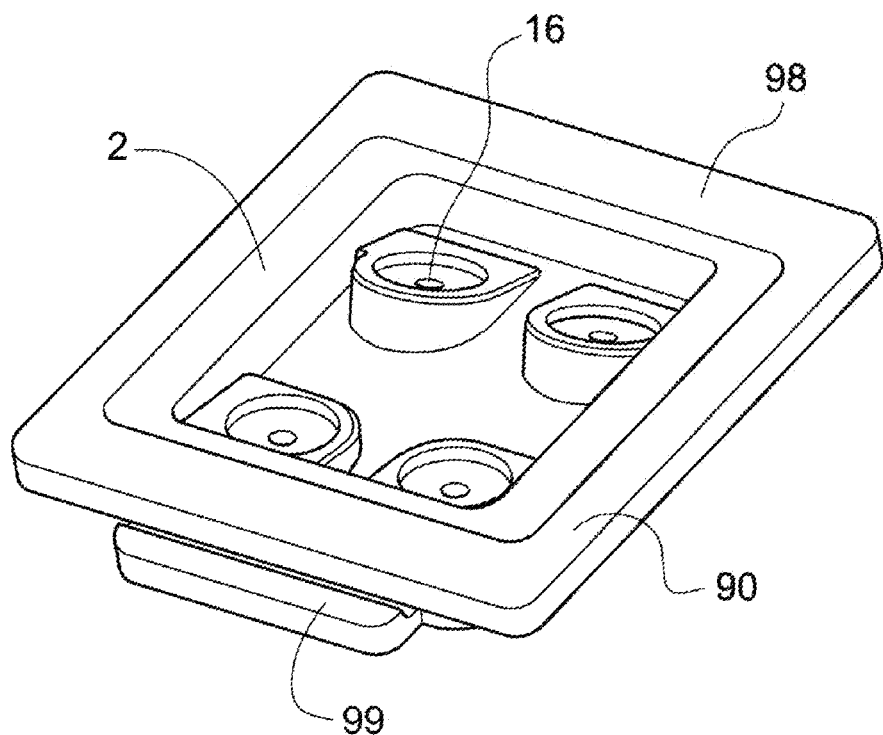
FIGS. 30A and 30B show perspective and plan views of a frame according to the present invention.
Figure 30B:
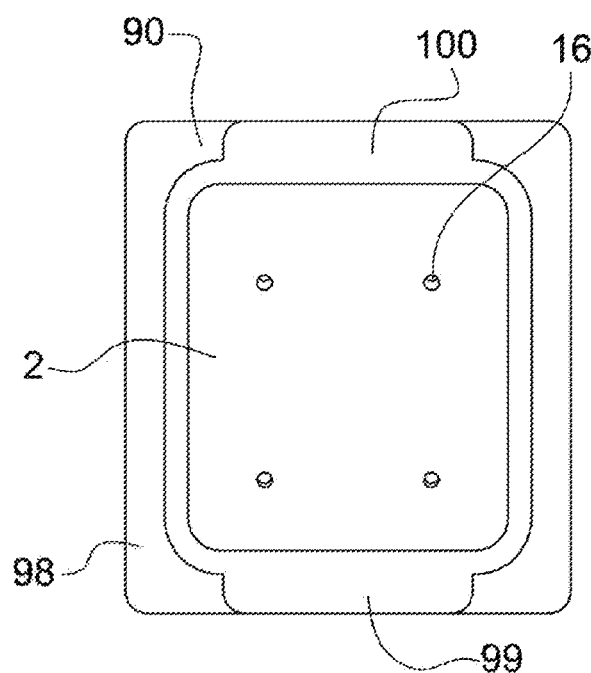

FIGS. 30A and 30B depict a frame 90 attachable to a bracket 2 of the present invention. FIG. 30B shows a rear view of a bracket 2 attached to a frame 90. As can be seen, the frame 90 may comprise an opening configured to receive a bracket 2.

As can be seen in FIG. 30B, the top surface of the frame 90 may comprise a rear rail 100. A groove may be formed in between the front surface 98 and rear rail 100. The bottom surface may also comprise a rear rail 99. A second groove may be formed between the front surface 98 and rear rail 99.

Figure 24A:
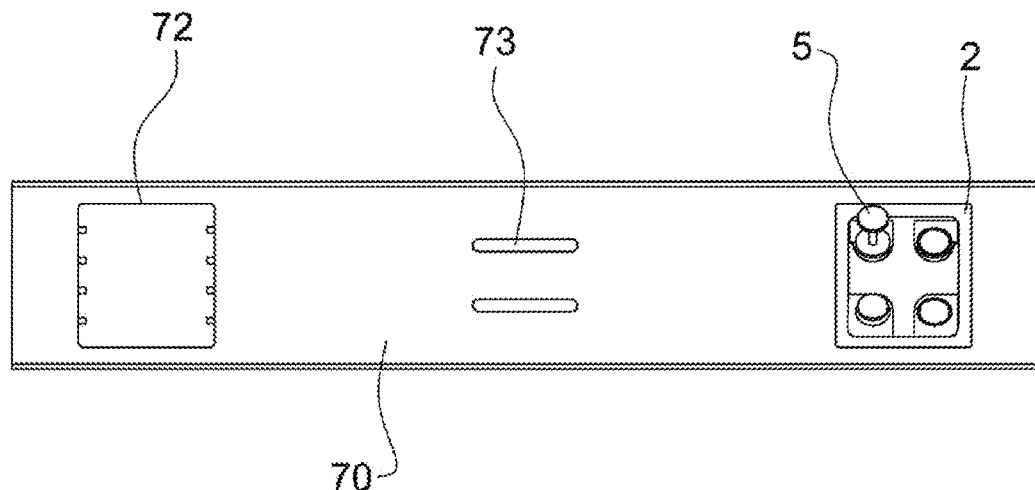
FIGS. 24A and 24B show plan views of a bar for use with the present invention in front and rear configurations.
Figure 24B:
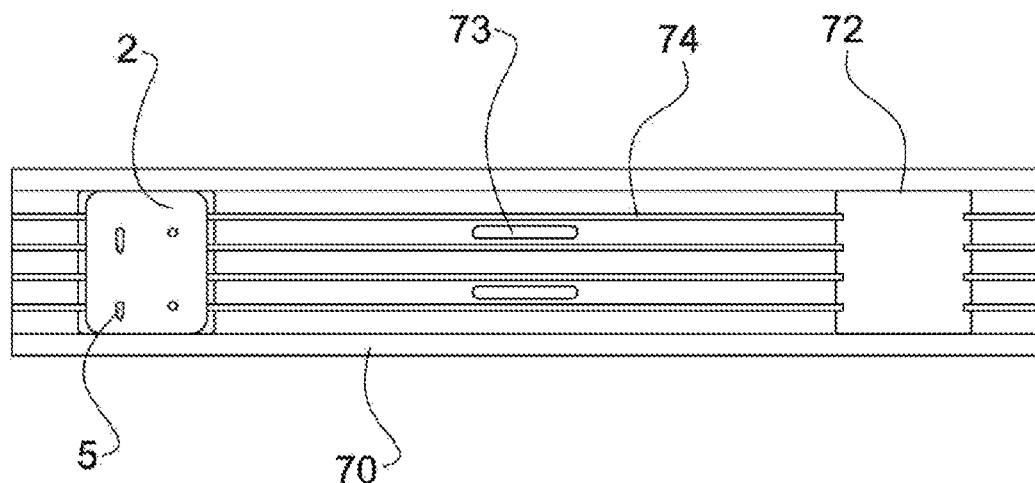

FIGS. 24A and 24B depict a bar 70 for use with the present invention. The bar 70 may be secured to a mounting surface using one or more brackets 2. In preferred arrangements, the bar 70 may be mounted horizontally to the mounting surface. However, arrangements, wherein the bar 70 is mounted vertically or at other angles, are also envisaged.

The bar 70 may be removably attachable to one or more brackets 2 and may comprise one or more openings 72 dimensioned and configured for receiving a bracket. The depicted arrangement, the bar 70 comprises two openings 72 located proximate to each end of the bar 70. It is envisaged that the bar may contain just one opening, which typically would be located at approximately the centre of the bar 70. In arrangements wherein the bar 70 comprises more than two openings 72, the openings may be arranged such that they are evenly spaced along the length of the bar 70.

FIG. 24A shows a front view of the bar 70. The bar 70 may be secured to a mounting surface using the bracket 2, which is received by an opening 72 of the bar. It can be appreciated that the second opening 72, depicted in FIG. 24A as not having received a bracket 2, may receive a second bracket. The bar 70 may therefore be secured to the mounting surface by more than one bracket 2. It can be appreciated that many mounting arrangements are possible: the bar 70 may comprise a plurality of openings 72 and be secured to the mounting surface by a plurality of brackets 2. It can also be appreciated that, in arrangements wherein the bar 70 comprises a plurality of openings 72, not all of the plurality of openings need receive a bracket 2, when the bar 70 is secured to the mounting surface.

The bar 70 may be of any suitable length and comprise one or more openings 72 for receiving up to a corresponding number of brackets 2. As will be clear, the more brackets used to secure a bar 70 of a given length to a mounting surface, the more securely the bar 70 will be held to the mounting surface and the greater the amount of weight the bar will be able to support. The user may decide how many brackets 2 to use to secure a bar 70 to a mounting surface based on the amount of weight the bar 70 is intended to support.

In FIGS. 24A and 30A, the bracket 2 is shown to comprise four pin apertures for receiving four pins 5. As previously discussed, the number of pins 5 used to secure a bracket 2 will affect the amount of weight that can be supported by the bracket. Alternative bracket arrangements are possible for use with the bar or frame, comprising one, two or more pin apertures. The more pins 5 used to the bracket 2, the more weight the bar 70 or frame 90 will be able to support.

FIG. 24B shows a rear view of the bar 70. The rear surface of the bar 70 may comprise one or more fins 74. The one or more fins 74 may run parallel to the length of the bar. In a preferred arrangement, the one or more fins may extend along substantially the entire length of the bar. It can be appreciated that, when secured to a mounting surface, the fins 74 space the bar 70 from the mounting surface in order to accommodate the one or more brackets 2.

Figure 29:
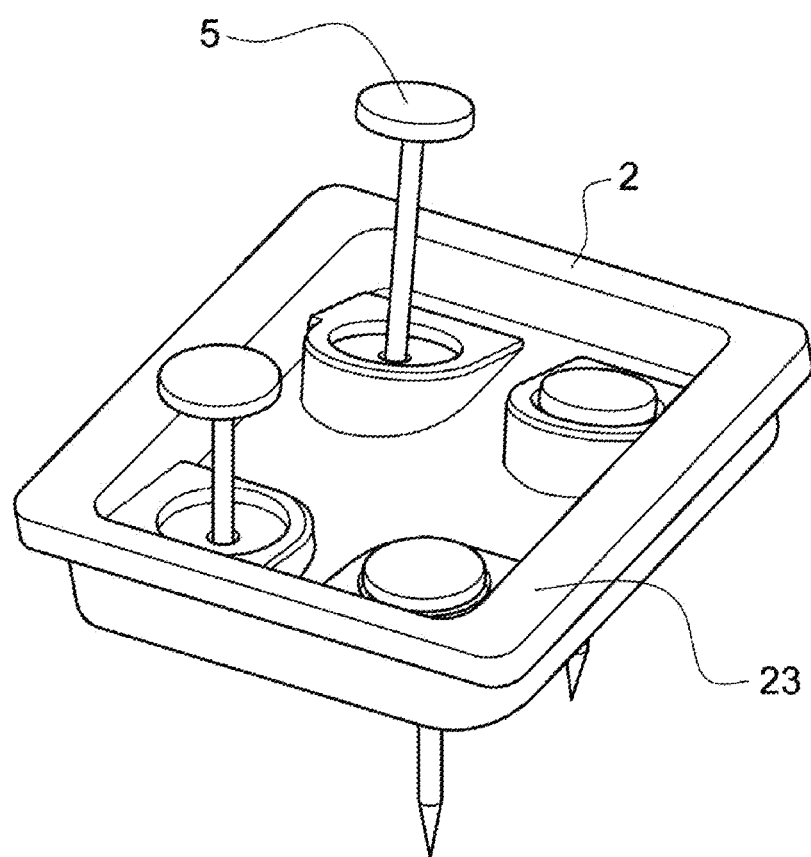
FIG. 29 shows a perspective view of a bracket according to the present invention.

As can be seen in FIG. 29, the bracket 2, for mounting the bar 70, may comprise a main body and bracket rails 23. As shown in FIG. 24B, the bracket 2 may be received in the opening 72 so that the many body of the bracket sits between a break in the one or more fins 74 and the rails 23 of the bracket rest upon the one or more fins 74. In alternative arrangements, the rails 23 of the bracket 2, may be attachable to the one or more fins 74 of the bar 70.

Figure 25A:
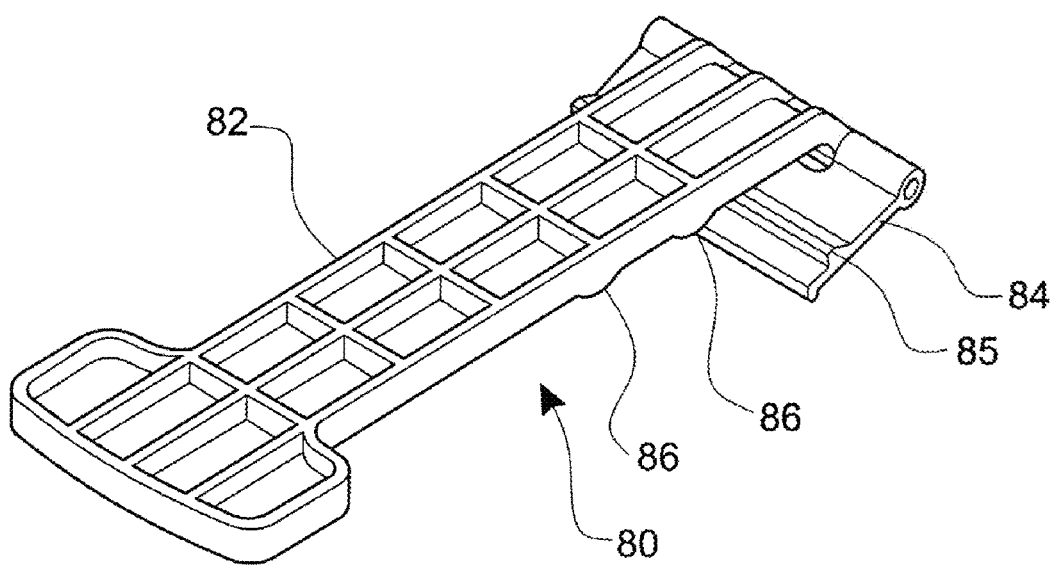
FIGS. 25A and 25B show perspective views of a lever used in connection with the present invention in top and bottom configurations.
Figure 25B:
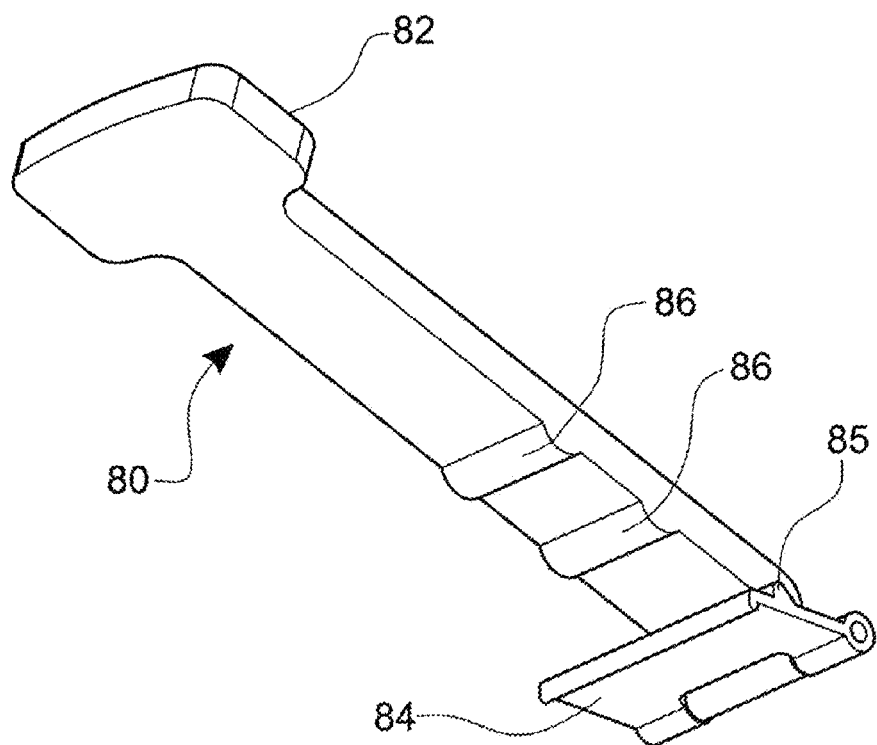

FIGS. 25A and 25B depict a lever 80 for use with a bar 70 or frame 90. Lever 80 comprises a lever arm 82 and a base 84. As can be seen from FIG. 25B, the bottom surface of the lever arm 82 may comprise one or more projections 86. The projections may take a variety of forms. For example, the projections may be point projections or they may be ridges, as depicted. As is shown in FIGS. 25A and 25B, the end of the lever arm 82 furthest from the point of attachment to the base 84 may be shaped to be easily actuated by the user.

Figure 26A:
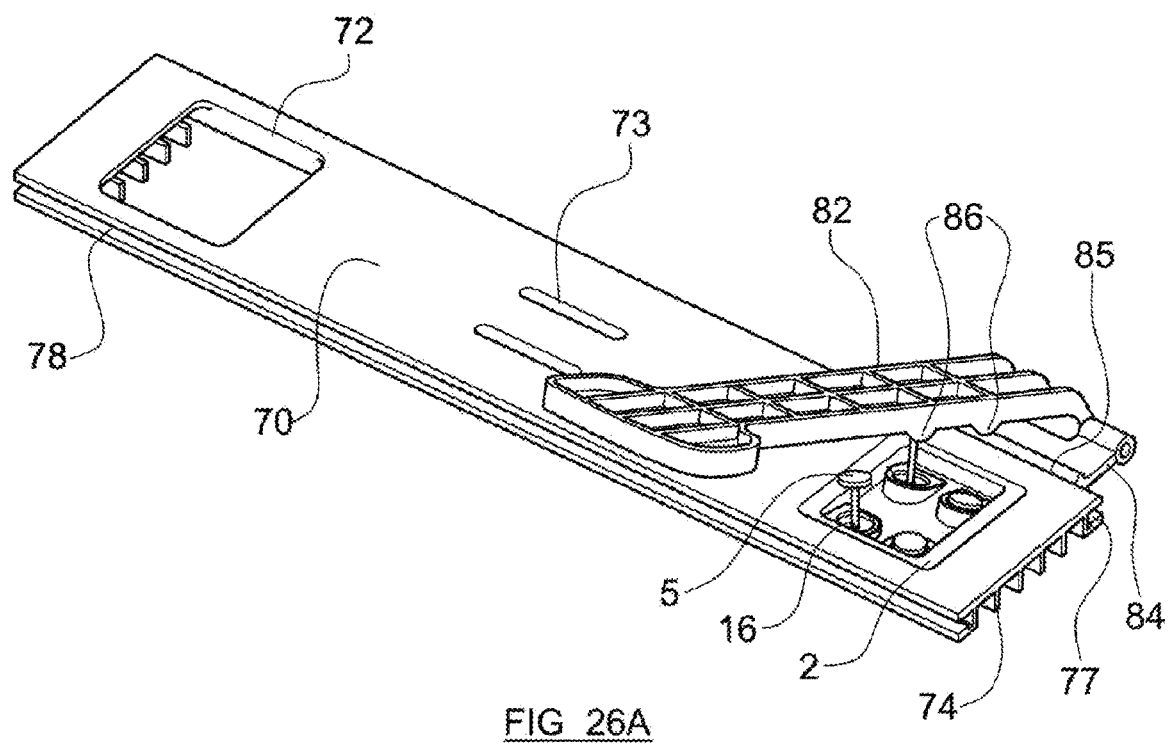
FIGS. 26A and 26B depict a perspective view of the mounting of a bracket according to the present invention.
Figure 26B:
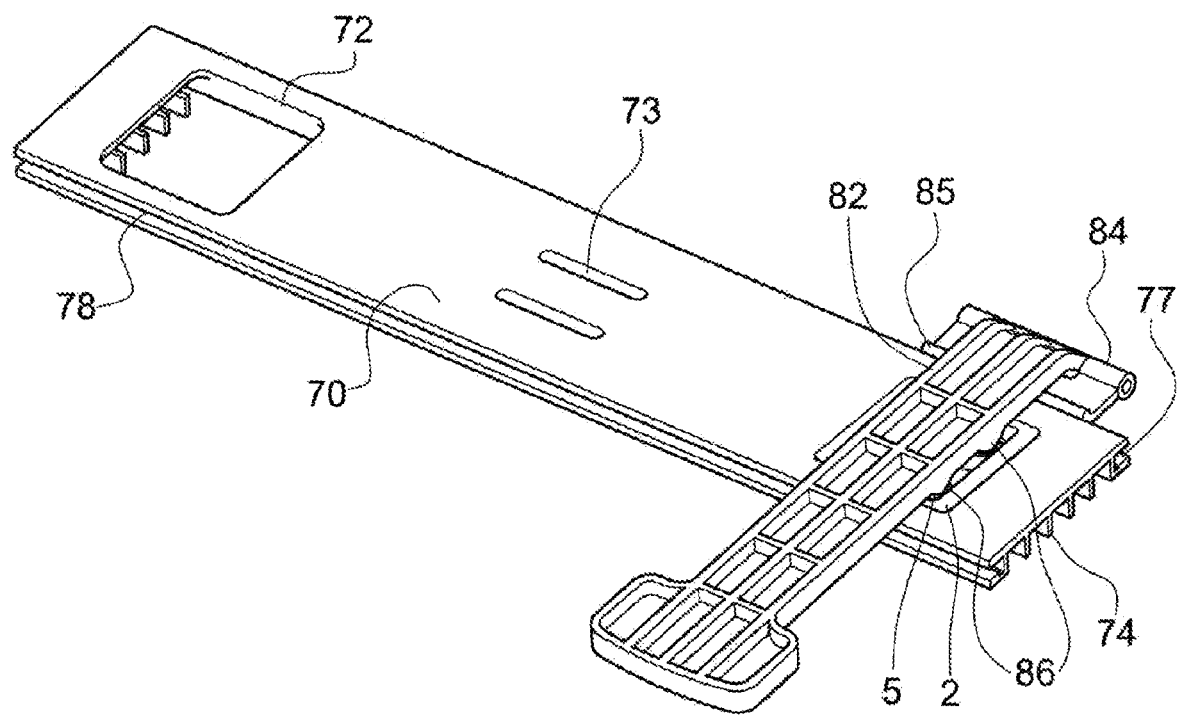

As depicted in FIGS. 26A and 26B, the bar 70 may comprise a top surface and a bottom surface, the top surface being the uppermost surface of the bar, when the bar is secured to a mounting surface, and the bottom surface being the lowermost surface of the bar, when the bar is secured to amounting surface. The top surface may comprise a front and a rear bar rails. The front and rear bar rails of the top surface may define a groove 77 therebetween. In a preferred arrangement, the bottom surface may also comprise front and rear bar rails defining a groove 78 therebetween. In a further preferred arrangement, each groove may extend along the entire length of the bar.

Figure 31:
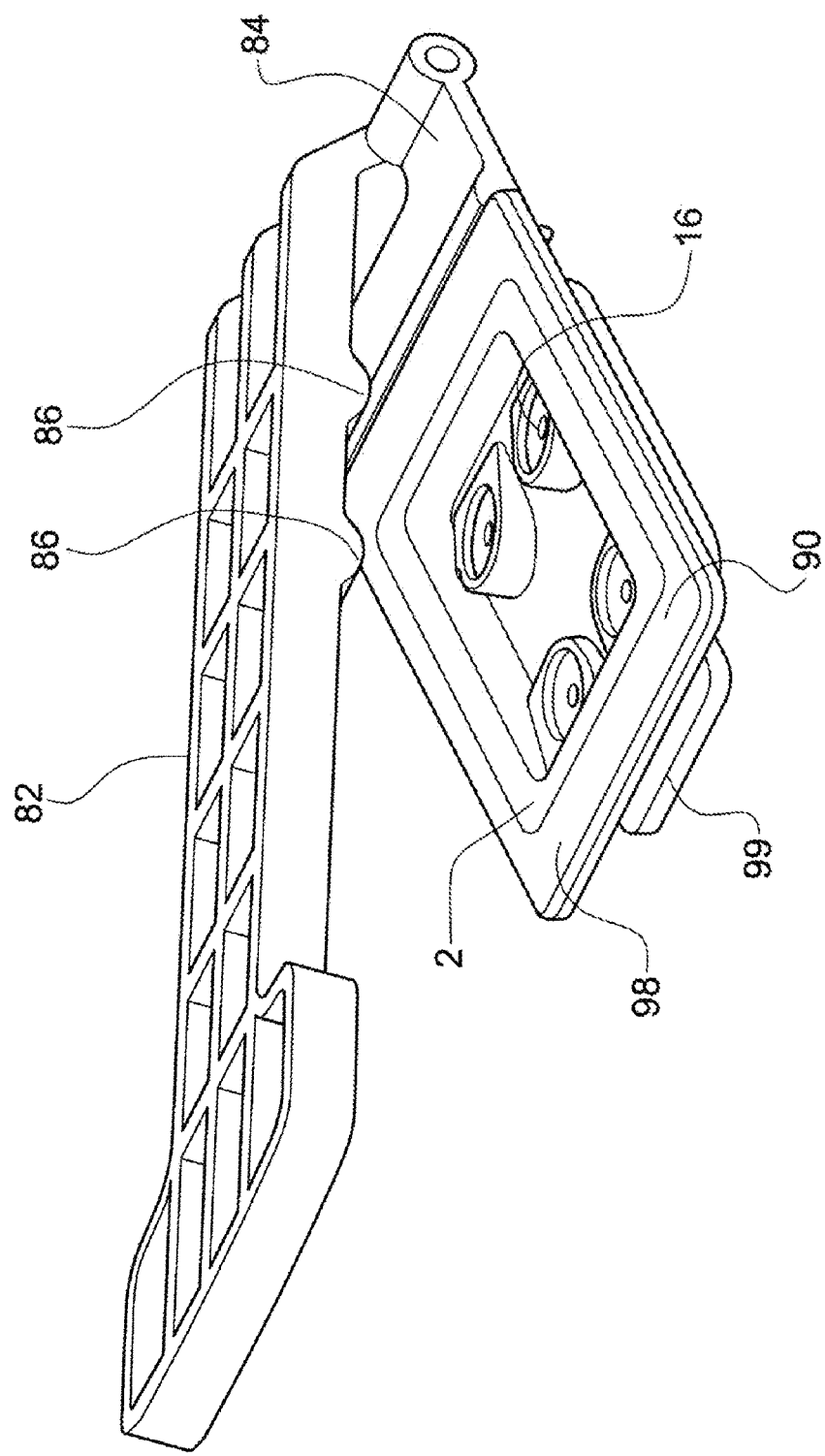
FIG. 31 shows a perspective view of a lever and frame according to the present invention.

FIGS. 26A, 26B and 31 show how the lever 80 may be used to mount the bar 70 or frame 90 to a mounting surface. The groove 77 of the bar may receive the bottom edge of the base 84, the bottom edge being the edge distal from the point of attachment to the lever arm 82. The bottom edge of the base 84 may be shaped and configured to be received by the groove 77 of the bar 70. Similarly, the first groove of the frame defined by the top surface 98 and the rear rail 100 may receive the bottom edge of the base 84. The bottom edge of the base 84 may be shaped and configured to be received by said first groove of the frame.

In a preferred arrangement, the bottom edge of the base 84 may be slidably attachable to the groove 77. When mounting the bar 70, the user may slide the base 84 into one end of the groove 77. The user is then able to slide the lever 80 along the groove 77 to the point where it is required. In another preferred arrangement, the bottom edge of the base may be slidably attachable to a groove of the frame 90.

As can be seen more clearly in FIG. 25A, the top surface of the base 84 may comprise a lip 85. Returning to FIGS. 26A and 31, when the bottom edge of the base 84 is received by the groove 77 of the bar 70 or groove of the frame 90, the lip 85 may rest on the front rail of the top surface of the bar or the front surface 98 of the frame, respectively. It can be appreciated that the lip 85 orientates the base 84 within the groove 77 or the groove of the bar and maintains the base parallel to the mounting surface, when the bar 70 or frame 90 is being mounted to the mounting surface. Further, the lip 85 ensures that the base 83 is retained in the groove 77 and prevents removal of the lever 80 in a vertical direction.

The lever 80 may be used to push the pins 5 of a bracket 2 into a mounting surface. It can be seen in FIGS. 26A and 26B that, when the lever 80 is attached to the bar 70 and positioned so that the lever arm 82 is directly in front of a bracket 2, the projections 86 on the bottom surface of the lever arm 82 align with the pins 5 and therefore the pin apertures 16 of the bracket 2. Similarly, when the lever 80 is attached to the frame 90, the projections 86 on the bottom surface of the lever arm 82 align with the pin apertures 16 of the bracket 2.

To mount the bracket 2, the user may apply a force on the end of the lever arm 82 furthest from the base 84, in the direction of the mounting surface. The lever arm 82 may be approximately 200 mm long. When a force is applied to the end of the lever arm 82 furthest from the base, the projections 86 contact the pins 5 and apply a force which causes the picture pins to be pushed through the pin apertures of the bracket 2 and into the mounting surface. The projections 86 lie closer to the pivot point of the lever 80 than the end of the lever arm 82 to which the initial force is applied by the user. Therefore, the force applied to the pins 5 will be greater than the force applied to the lever arm 82 by the user, enabling ready mounting of the pins 5 to the mounting surface. It can be appreciated that the lever 80 reduces the amount of user effort required to mount the pins 5. It can also be appreciated that the lever 80 allows the simultaneous insertion of multiple pins 5 into the mounting surface, further reducing the time and effort required to mount a bracket 2. The projections 86 are advantageous because they have a small surface area. The small surface area means that the pressure applied to the pins 5 is high.

It can be appreciated that the projections 86 should be positioned on the bottom surface of the lever arm 82 so as to align with the pin apertures 16 of a bracket 2, when the lever 80 is attached to the bar 70 or frame 90. In FIG. 25B, the lever 80 is shown to comprise projections 86 in the form of two ridges perpendicular to the length of the lever arm 82. In FIGS. 26A and 26B, these two ridges can be seen to align with four pins 5, in an arrangement of the invention wherein the bracket 2 comprises four pin apertures 16, each aperture located at the corner of a rectangle. It can be appreciated, as previously described, that the bracket 2 is not limited to an arrangement comprising four pin apertures. The bracket 2 may comprise one or more pin apertures 16. Furthermore, different arrangements of the one or more pin apertures 16 are possible. For example, the four pin apertures 16, in FIGS. 26A and 26B, could also be arranged linearly within the bracket 2. It can therefore be appreciated that many arrangements of lever 80 are envisaged, each comprising different arrangements of projections 86 to correspond to the number and arrangement of pin apertures 16 in different brackets 2.

It can also be appreciated that the size of the lever arm 82 may vary depending on the mounting surface. For harder surfaces, where a greater force is required to push the pins 5 into the mounting surface, a longer lever arm 82 may be advantageous. Using a longer lever arm 82, the user would be able to apply a greater force to the pins 5, for the same amount of force applied to the lever arm, when compared to an arrangement in which the lever 80 comprises a shorter lever arm 82.

Figure 27A:
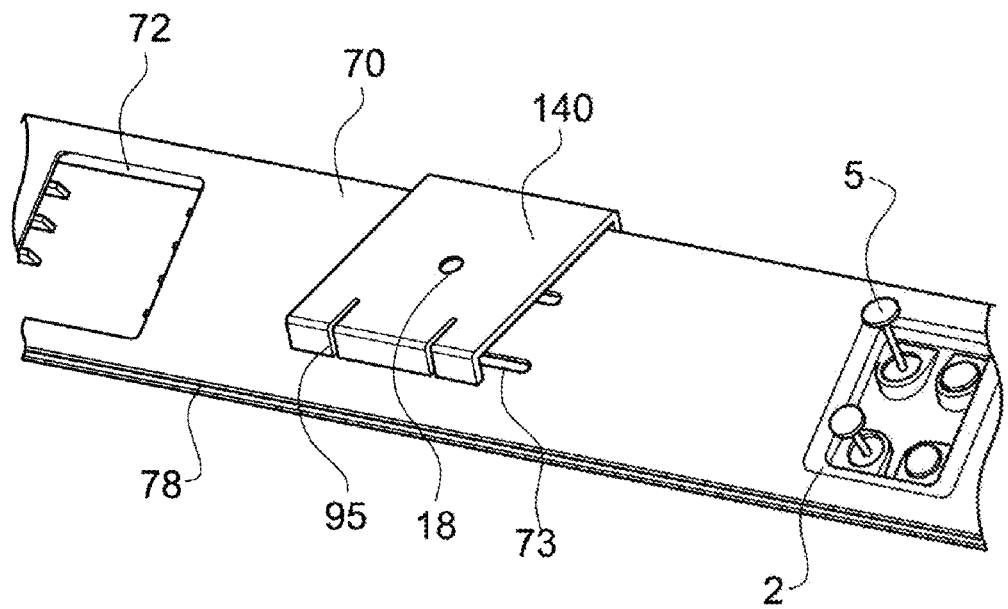
FIGS. 27A and 27B show perspective views of a device according to the present invention.
Figure 27B:
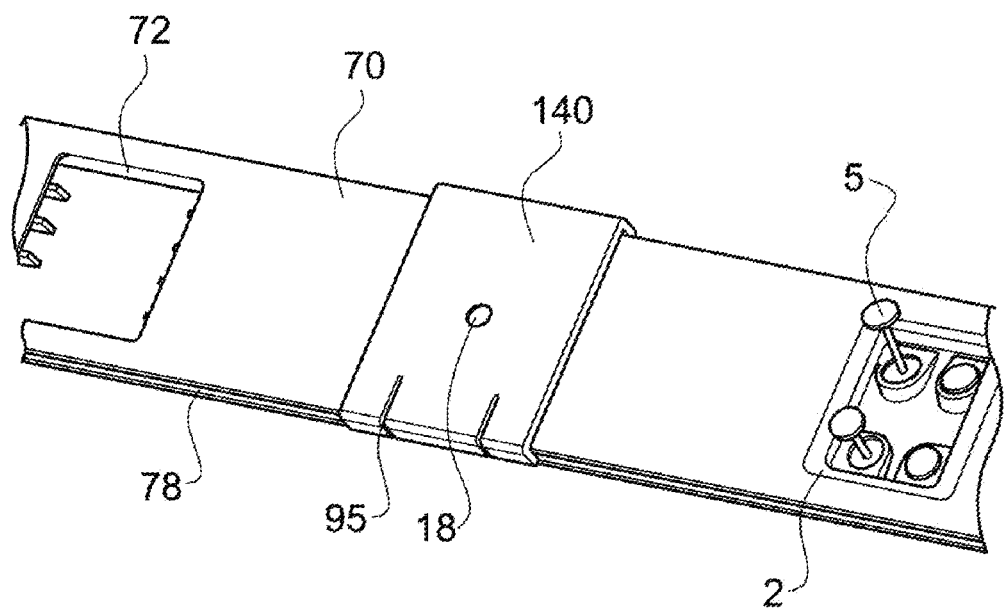

As can be seen in FIGS. 27A and 27B, a cover 140 may be removably attachable to the bar 70. FIGS. 27A and 27B show a single cover 140 being attached to the bar 70. In alternative arrangements, a plurality of covers 140 may be attached to the bar 70. The user may choose how may covers to attach depending on the desired object to be supported by the bar 70.

Figure 28:
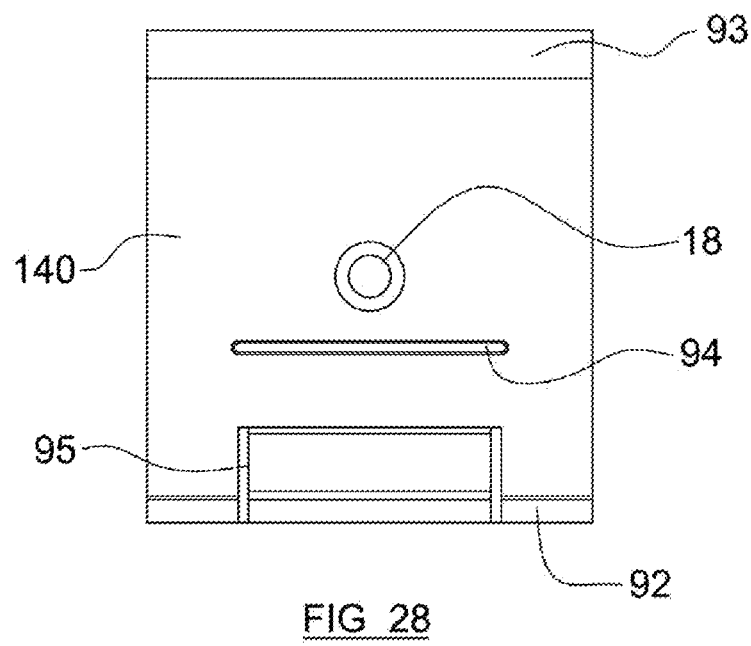
FIG. 28 shows a plan view of the rear of a cover according to the present invention.

FIG. 28 shows a rear view of a cover 140 for attachment to the bar 70 or frame. The cover 140 may comprise a top surface and a bottom surface. The top surface of the cover 140 may comprise a flange 93 and the bottom surface of the cover 140 may comprise a flange 92. As is shown in FIG. 27A, the flange 93 of the cover 140 may be dimensioned and configured to be received by the groove 77 of the bar 70. The user may hook the cover 140 onto the bar 70 by inserting the flange 93 into groove 77. The flange 92 of the cover 140 may then be inserted into groove 78 of the bar 70. It can be appreciated that arrangements, wherein the bar 70 comprises a top groove 77 and a bottom groove 78, are advantageous for the attachment of a cover 140 comprising flanges 93 and 92.

As depicted in FIGS. 27A, 27B and 28, the bottom of the cover 140 may comprise one or more slits 95. The slits 95 may allow the bottom of the cover 3 to flex. The increased flexibility of the bottom of the cover allows the user to more easily insert flange 92 into the groove 78 once the flange 93 has been received by the groove 77.

A cover 140 comprising at least one means for attaching an object, or having an object integrally attached, may also be attached to the frame 90. The cover 140 may comprise top and bottom flanges 93 and 92 dimensioned and configured to be received by the grooves of the frame 90.

A cover 140 may be attached to, and held in place on, the bar 70 or frame 90 by way of a snap fit, interference fit or friction fit. It is envisaged that in arrangements, wherein the cover 140 is held to the bar 70 or frame 90 by way of a snap fit, a release key may be provided for removal of the cover from the bar.

In FIGS. 24A and 24B, it can be seen that the bar 70 may be provided with one or more slots 73. In the absence of a cover 140, the one or more slots 73 may function as means for attaching an object. In FIG. 27A, it can be seen that a cover 140 may be attached to the bar 70 at the location of one or more of the slots 73. In FIG. 28, it can be seen that the rear surface of the cover 140 may comprise one or more tabs 94 for insertion into one or more slots 73, when the cover is connected to the bar 70. The one or more slots 73 may therefore additionally function as an attachment means for a cover 140.

In FIGS. 24A and 24B, the bar 70 is depicted as comprising two slots 73. As can be appreciated, the bar 70 may comprise a single slot 73 for attachment of a cover 140, as depicted in FIG. 28. As can also be appreciated the bar 70 may comprise slots 73 spaced along the length of the bar 70. The spaced slots 73 may acts as attachment means for a number of objects or attachment means for a number of covers 140 or a combination of both.

In FIGS. 27A and 27B, the cover 140 is depicted as being attached to the bar 70 remote from the bracket 2. Covers 140 may also be attached to the bar 70 at the locations of brackets 2 and/or openings 72. The one or more tabs 94 may fit within a bracket, to assist with locating the cover 140 over the bracket 2. This has the aesthetic advantage of hiding the brackets 2 and openings 72, when the bar 70 is mounted on the mounting surface. Arrangements in which a plurality of covers 140 are attached to the bar 70 and one or more of said covers hide one or more brackets 2 and/or openings 72, and the remaining covers 140 are attached elsewhere on the bar 70, are also envisaged.

It can be further be appreciated that any brackets 2 and/or openings 72 visible after mounting the bar 70, may be hidden by alternative means. For example, a cover or covers not comprising attachment means may be attached to the bar 70 to obscure brackets and openings from view, once the bar 70 has been mounted.

In FIGS. 27A, 27B and 28, the cover 140 is depicted as comprising a screw hole 18 for attachment of an object. This is just one possible arrangement of the invention. Covers comprising alternative attachment means, as previously described, may also be used with the bar 70.

Once mounted on the mounting surface, the bar 70 may be used to mount objects such as bike racks, curtains, towel rails and tool racks. Various types of cover 140 may be used in combination with the bar 70, for mounting such objects. The objects may be attachable directly to the one or more covers 140.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination, be utilised for realising the invention in diverse forms thereof.

What is claimed is:

1. A mounting device comprising:
    a bracket, the bracket having a top surface, side surfaces, a rear surface, and a front surface;
    an adhesive pad, the adhesive pad comprising a rear surface and a front surface, wherein the rear surface is attachable to the rear surface of the bracket and the front surface comprises an adhesive layer; and
    a cover, frame, or bar, wherein the cover, frame, or bar is removably attachable to the bracket and either comprises at least one means for attaching an object or has an object integrally attached,
    wherein the bracket further comprises two or more pin apertures to receive two or more pins from the front surface through to the rear surface,
    wherein the mounting device further comprises the two or more pins, and
    wherein the two or more pins are connected by a bridge.

2. The device of claim 1, wherein the rear surface of the bracket comprises a circumferential trench.

3. The device of claim 2, wherein the rear surface of the bracket comprises a perimeter having a length and wherein the trench extends along an entire length of the perimeter.

4. The device of claim 2, further comprising a sealing element connected in or on the trench, wherein the sealing element engages the trench and wherein the connection is made by over-molding.

5. The device of claim 1, comprising the cover, wherein the cover is slidably attachable to the bracket.

6. The device of claim 1, comprising the cover, wherein the cover is attachable to more than one bracket.

7. The device of claim 1, wherein the at least one means for attaching the object comprises one or more of a notch, an aperture, a hook, or a magnetic pad.

8. The device of claim 1, comprising the cover, wherein the cover comprises at least one screw hole for attaching the object, optionally wherein the screw hole is blanked.

9. The device of claim 1, comprising the cover, wherein the cover comprises at least one means for attaching the object and further comprises an object which is removably attachable to the cover.

10. The device of claim 1, comprising the cover and the frame, wherein the cover is removably attachable to the bracket and the frame via a snap fit, interference fit, or friction fit between the cover and the bracket.

11. A kit comprising the device of claim 1 and one or more of:
    the object for attachment;
    one or more attachment screws for attaching an object for attachment;
    a release key for releasing the cover and the frame;
    at least one screw for screwing the bracket to a mounting surface;
    a detachable spirit-level unit;
    at least one pin or a plurality of pins;
    one or more covers;
    one or more brackets;
    the frame;
    the bar;
    a lever; and
    a template installer.

12. The device of claim 1, comprising the cover and the frame, wherein the cover is removably attachable to the bracket and the frame via a snap fit, interference fit, or friction fit between the cover and the frame.

13. The device of claim 1, comprising the bar and the cover, wherein the cover is removably attachable to the bar via a snap fit, interference fit, or friction fit between the cover and the bar.

14. The device of claim 1, comprising a plurality of covers and picture frame or shelf integrally attached integrally attached to more than one cover.

15. The device of claim 1, comprising a template installer.

16. The device of claim 1, comprising the cover, wherein the cover comprises at least one side wall.

17. The device of claim 16, wherein the bracket further comprises a rail on two of the side surfaces.

18. The device of claim 16, wherein the bracket further comprises a rail on at least one of the side surfaces.

19. The device of claim 18, wherein the cover comprises the at least one side wall and an inner surface and wherein the inner surface comprises a groove for receiving the rail on the at least one of the side surfaces of the bracket.

20. The device of claim 19, wherein the cover comprises a top face, a right side wall, and a left side wall, and wherein at least the right side wall and the left side wall each comprise a respective groove for receiving the rail of the bracket.

21. The device of claim 20, wherein the rail comprises a left edge and a right edge, and wherein the groove of the left side wall of the cover is configured to receive the left edge of the rail and the groove of the right side wall of the cover is configured to receive the right edge of the rail.

22. The device of claim 1, wherein each of the two or more pin apertures of the bracket is configured to receive the at least one pin in a direction pointing downwardly away from the top surface of the bracket and at an angle relative to the top surface of the bracket that is in a range of approximately 0 to 45°.

23. The device of claim 22, wherein the angle relative to the top surface of the bracket is in the range of approximately 10° to 30°.

24. The device of claim 23, wherein the angle relative to the top surface of the bracket is 15°.

25. The device of claim 1, wherein the bracket further comprises at least one screw aperture for receiving at least one screw on the front surface of the bracket.

26. The device of claim 1, wherein the two or more pin apertures are aligned parallel to the top surface of the bracket.

27. The device of claim 1, the two or more pins comprising two picture pins, wherein the bracket comprises two pin apertures for receiving the two picture pins.

28. The device of claim 1, the two or more pins comprising four picture pins, wherein the bracket comprises four pin apertures for receiving the four picture pins.

29. The device of claim 1, comprising the frame, wherein the frame comprises:
an opening configured to receive the bracket;
a front surface surrounding the opening;
a top surface comprising a first rear rail; and
a bottom surface comprising a second rear rail;
wherein a first groove is located between the first rear rail and the front surface of the frame, and a second groove is located between the second rear rail and the front surface of the frame.

30. The device of claim 29 further comprising at least one cover, wherein the at least one cover comprises the at least one means for attaching the object or has an object integrally attached and wherein the at least one cover is attachable to the frame or the bar.

31. The device of claim 29 further comprising at least one cover, wherein the at least one cover comprises a top surface and a bottom surface, wherein the top surface of the cover comprises a first flange for attachment to the first groove of the frame and the bottom surface of the cover comprises a second flange for attachment to the second groove of the frame.

32. The device of claim 29, further comprising a lever having a lever arm and a base, wherein the lever arm is pivotably attached to the base.

33. The device of claim 32, wherein the base of the lever comprises a bottom edge, wherein the bottom edge is configured to be received by the first or second groove of the frame or a groove of the bar, and wherein the base comprises a lip for retaining the lever in the first or second groove of the frame or the groove of the bar.

34. The device of claim 33, wherein the lever arm comprises one or more projections positioned to align with a pin aperture of the bracket when the lever is attached to the frame or bar, and the frame or bar is attached to the bracket.

35. The device of claim 1, comprising a bar, wherein the bar comprises a length and at least one opening configured to receive the bracket.

36. The device of any of claim 35, wherein the bar further comprises at least one slot for attachment of the cover.

37. The device of any of claim 35, wherein, when the device is in use, a towel rail, a curtain or curtain rail, a tool rack, or a bike rack are mountable to the bar.

38. The device of claim 35, further comprising a plurality of brackets and wherein the bar comprises at least a respective number of openings for receiving the plurality of brackets.

39. The device of claim 38, wherein the openings are evenly spaced along the length of the bar.

40. The device of claim 39, wherein the bar comprises a rear surface and a front surface, wherein the rear surface of the bar comprises one or more lengthwise fins, and wherein the one or more fins extend along substantially an entire length of the bar.

41. The device of claim 35, wherein the bar comprises a rear surface and a front surface, wherein the rear surface of the bar comprises one or more lengthwise fins, and wherein the one or more fins extend along substantially an entire length of the bar.

42. The device of claim 35, wherein the bar comprises a top surface and a bottom surface, each of the top and bottom surfaces of the bar having bar rails, the bar rails of the top surface of the bar defining a first lengthwise groove and the bar rails of the bottom surface of the bar defining a second lengthwise groove.

43. The device of claim 42, wherein the bar comprises a rear surface and a front surface, wherein the rear surface of the bar comprises one or more lengthwise fins, and wherein the one or more fins extend along substantially an entire length of the bar.

44. The device of claim 42 further comprising at least one cover, wherein each cover comprises the at least one means for attaching the object or has the object integrally attached and wherein each cover is attachable to the frame or the bar.

45. The device of claims 32, wherein a lever is movable between an open position and a closed position, and wherein when the lever is attached to a rail of the frame or the bar rail of the bar the one or more projections of the lever arm can act on the one or more pins.

46. The device of claim 42, wherein the first and second lengthwise grooves defined by the bar rails extend along substantially an entire length of the bar.

47. The device of claim 46 further comprising at least one cover, wherein each cover comprises the at least one means for attaching the object or has the object integrally attached and wherein each cover is attachable to the bar.

48. The device of claim 1, comprising the cover, wherein the cover comprises a front surface, wherein the at least one means for attaching the object is a hook, and wherein the hook is slidable between a first position in which the hook does not protrude from the front surface of the cover and a second position in which the hook protrudes from the front surface of the cover.

49. The device of claim 48, wherein the hook comprises an object aperture for receiving part of the object.

50. The device of claim 48, wherein the front surface of the cover comprises a finger depression adjacent to the hook.

51. The device of claim 1, comprising the object, wherein the object is selected from the group consisting of a hook, an LED light, a clock, a rail, a shelf, a picture frame, a toilet roll holder, or a gallery kit housing for projecting one or more laser beams.

52. The device of claim 51, wherein the object is the gallery kit housing, and the gallery kit housing comprises a rotatable portion.

53. The device of claim 51, comprising a plurality of covers and picture frame integrally attached to more than one cover.

54. The device of claim 1, wherein the adhesive pad comprises a release tag for removal of the adhesive pad.

55. The device of claim 54, wherein, when the device is in use, the release tag is sandwiched between the top surface of the bracket and a top face of the cover and is thereby not visible.

56. The device of claim 1, comprising the cover, the frame and the bar, wherein the cover is removably attachable to the bracket, the frame, or the bar via a snap fit, interference fit, or friction fit between the cover and the bracket, the frame, or the bar.

57. The device of claim 56, wherein the cover is removably attached to the bracket and further comprising a release key configured to release a snap fit between the cover and the bracket.

58. The device of claim 56, wherein the cover is removably attached to the frame and further comprising a release key configured to release a snap fit between the cover and the frame.

59. The device of claim 56, wherein the cover is removably attached to the bar and further comprising a release key configured to release a snap fit between the cover and the bar.

60. The device of claim 1, further comprising a spirit level unit.

61. The device of claim 60, wherein the spirit level unit is detachable and comprises a spirit level vial and optionally a spirit level holder.

62. The device of claim 61, wherein the bracket comprises a means of attachment for the spirit level unit.

63. The device of claim 61, wherein the spirit level unit comprises a finger pull tab or handle.

64. The device of claim 60, wherein the spirit level unit is integral with the front surface of the bracket.

\* \* \* \* \*